US011724941B2

(12) United States Patent
Hakovirta et al.

(10) Patent No.: US 11,724,941 B2
(45) Date of Patent: Aug. 15, 2023

(54) SYNTHESIS OF MICRON AND NANOSCALE CARBON SPHERES AND STRUCTURES USING HYDROTHEMAL CARBONIZATION

(71) Applicant: North Carolina State University, Raleigh, NC (US)

(72) Inventors: Marko Hakovirta, Raleigh, NC (US); Daniel Saloni, Raleigh, NC (US); Richard Venditti, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 43 days.

(21) Appl. No.: 16/970,265

(22) PCT Filed: Feb. 15, 2019

(86) PCT No.: PCT/US2019/018312
§ 371 (c)(1),
(2) Date: Aug. 14, 2020

(87) PCT Pub. No.: WO2019/161272
PCT Pub. Date: Aug. 22, 2019

(65) Prior Publication Data
US 2021/0107796 A1   Apr. 15, 2021

Related U.S. Application Data

(60) Provisional application No. 62/631,108, filed on Feb. 15, 2018.

(51) Int. Cl.
*C01B 32/05* (2017.01)
*C01B 32/318* (2017.01)

(52) U.S. Cl.
CPC ............ *C01B 32/318* (2017.08); *C01B 32/05* (2017.08); *C01P 2002/85* (2013.01); *C01P 2004/03* (2013.01); *C01P 2004/61* (2013.01); *C01P 2004/64* (2013.01)

(58) Field of Classification Search
CPC .................................................... C01B 32/05
See application file for complete search history.

(56) References Cited

U.S. PATENT DOCUMENTS

| | | |
|---|---|---|
| 4,885,109 A | 12/1989 | Umemoto et al. |
| 5,603,836 A | 2/1997 | Wollrich |
| 6,106,818 A | 8/2000 | Dulog et al. |
| 6,611,707 B1 | 8/2003 | Prausnitz et al. |
| 7,918,814 B2 | 4/2011 | Prausnitz et al. |
| 8,257,324 B2 | 9/2012 | Prausnitz et al. |
| 8,414,664 B2 | 4/2013 | Heilmann et al. |
| 8,637,718 B2 | 1/2014 | Gupta et al. |
| 9,109,180 B2 | 8/2015 | Wolf et al. |
| 9,238,583 B2 | 1/2016 | Vyskocil et al. |
| 9,290,390 B2 | 3/2016 | De Leij et al. |
| 9,318,773 B2 | 4/2016 | Wang et al. |
| 9,359,390 B2 | 6/2016 | Hitomi et al. |
| 9,458,021 B2 | 10/2016 | Mitra |
| 9,478,365 B2 * | 10/2016 | Mitlin ..................... H01G 11/36 |
| 9,718,717 B2 | 8/2017 | Pardo et al. |
| 9,828,249 B2 | 11/2017 | Jones |
| 9,879,344 B2 | 1/2018 | Lee et al. |
| 10,415,184 B2 * | 9/2019 | Wittmann ............... C01B 32/05 |
| 2008/0274151 A1 | 11/2008 | Asano et al. |
| 2010/0101142 A1 | 4/2010 | Eisner et al. |
| 2011/0112246 A1 | 5/2011 | Antonietti et al. |
| 2012/0244097 A1 | 9/2012 | Lu et al. |
| 2013/0260431 A1 | 10/2013 | Bauer |
| 2014/0079686 A1 | 3/2014 | Barman et al. |
| 2014/0104754 A1 | 4/2014 | Lipka et al. |
| 2014/0142353 A1 | 5/2014 | Hitzl et al. |
| 2014/0345343 A1 | 11/2014 | Wilson et al. |
| 2015/0218757 A1 | 8/2015 | Heiskanen et al. |
| 2015/0258120 A1 | 9/2015 | Zarnitsyn et al. |
| 2015/0321173 A1 | 11/2015 | Gronberg et al. |
| 2016/0230099 A1 | 8/2016 | Hilli |
| 2016/0361700 A1 | 12/2016 | Shekarriz |
| 2017/0058127 A1 | 3/2017 | Naduvile et al. |

(Continued)

FOREIGN PATENT DOCUMENTS

| | | |
|---|---|---|
| CN | 106581762 A | 4/2017 |
| CN | 104367940 B | 9/2017 |

(Continued)

OTHER PUBLICATIONS

International Preliminary Report on Patentability corresponding to International application No. PCT/US 2019/018312 dated Aug. 27, 2020.
International Search Report and Written Opinion of the International Searching Authority corresponding to International application No. PCT/US 2019/018312 dated Jun. 20, 2019.
International Search Report and Written Opinion of the International Searching Authority corresponding to International application No. PCT/US 2019/025992 dated Jun. 24, 2019.
International Preliminary Report on Patentability corresponding to International application No. PCT/US 2019/025992 dated Oct. 6, 2020.

(Continued)

*Primary Examiner* — Stuart L Hendrickson
(74) *Attorney, Agent, or Firm* — Jenkins, Wilson, Taylor & Hunt, P.A.

(57) ABSTRACT

Provided are methods for preparing carbon powders and activated carbon powders from cellulose-containing liquids. In some embodiments, the methods include exposing a cellulose-containing liquid to a hydrothermal carbonization process to convert the carbonaceous material present therein into a carbon powder. Also provided are methods for activating carbon powders, methods for producing carbon powder-containing polymer matrices, and carbon powders, activated carbon powders, and polymer matrices that that include the disclosed carbon powders and/or activated carbon powders that are produced by the presently disclosed methods.

39 Claims, 14 Drawing Sheets

(56) References Cited

U.S. PATENT DOCUMENTS

| | | |
|---|---|---|
| 2017/0197858 A1 | 7/2017 | Pardo et al. |
| 2017/0210625 A1 | 7/2017 | Pardo et al. |
| 2017/0216498 A1 | 8/2017 | Kang et al. |
| 2017/0247255 A1 | 8/2017 | Wittmann |
| 2018/0037461 A1 | 2/2018 | Conner et al. |
| 2018/0042765 A1 | 2/2018 | Noronha et al. |
| 2021/0161968 A1 | 6/2021 | Gu et al. |
| 2021/0162097 A1 | 6/2021 | Brown et al. |
| 2021/0236336 A1 | 8/2021 | Gilger et al. |

FOREIGN PATENT DOCUMENTS

| | | |
|---|---|---|
| EP | 2226414 A1 | 9/2010 |
| JP | 2009-298972 | 12/2009 |
| WO | WO 2007/092350 A1 | 8/2007 |
| WO | WO 2011/064441 A1 | 6/2011 |
| WO | WO 2011/084925 A2 | 7/2011 |
| WO | WO 2012/043103 A1 | 4/2012 |
| WO | WO 2012/107643 A2 | 8/2012 |
| WO | WO 2012/119229 A1 | 9/2012 |
| WO | WO 2014/072886 A1 | 5/2014 |
| WO | WO 2016/057833 A1 | 4/2016 |
| WO | WO 2017/078641 A1 | 5/2017 |
| WO | WO 2017/143153 A1 | 8/2017 |
| WO | WO 2017/151727 A1 | 9/2017 |
| WO | WO 2018/039612 A1 | 3/2018 |
| WO | WO 2018/106696 A1 | 6/2018 |
| WO | WO 2019/084259 A1 | 5/2019 |
| WO | WO 2019/195681 A1 | 10/2019 |
| WO | WO 2019/200063 A1 | 10/2019 |
| WO | WO 2019/200081 A1 | 10/2019 |
| WO | WO 2019/217678 A1 | 11/2019 |

OTHER PUBLICATIONS

International Search Report and Written Opinion of the International Searching Authority corresponding to International application No. PCT/US 2019/031518 dated Jul. 25, 2019.
International Preliminary Report on Patentability corresponding to International application No. PCT/US 2019/031518 dated Nov. 10, 2020.
International Search Report and Written Opinion of the International Searching Authority corresponding to International application No. PCT/US 2019/026962 dated Jul. 1, 2019.
International Preliminary Report on Patentability corresponding to International application No. PCT/US 2019/026962 dated Oct. 13, 2020.
International Search Report and Written Opinion of the International Searching Authority corresponding to International application No. PCT/US 2019/026933 dated Jun. 28, 2019.
International Preliminary Report on Patentability corresponding to International application No. PCT/US 2019/026933.
Akamatsu et al., "The Possible Role of Reactive Oxygen Species Generated by Neutrophils in Mediating Acne Inflammation," Dermatology, vol. 196, pp. 82-85 (1998).
Aktan et al., "Anxiety, depression, and nature of acne vulgaris in adolescents," Int. J. Dermatol., vol. 39, pp. 354-357 (2000).
Al-Ghouti et al., "The removal of dyes from textile wastewater: a study of the physical characteristics and adsorption mechanisms of diatomaceous earth," J. Environ. Manage, vol. 69, pp. 229-238 (2003).
Aschauer et al., "Analysis of Transduction Efficiency, Tropism and Axonal Transport of AAV Serotypes 1, 2, 5, 6, 8 and 9 in the Mouse Brain." PLoS One. vol. 8, Article ID e76310 (2013).
Bemelmans et al., "Efficient lentiviral gene transfer into corneal stroma cells using a femtosecond laser." Gene Ther., vol. 16(7), pp. 933-938 (2009).
Briganti et al., "Antioxidant activity, lipid peroxidation and skin diseases. What's new," J. Eur. Acad. Dermatol. Venereol., vol. 17, pp. 663-669 (2003).

Brüggemann et al., "The Complete Genome Sequence of Propionibacterium acnes, a Commensal of Human Skin," Science, vol. 305, pp. 671-673 (2004).
Chan et al., "Direct Colorimetric Assay of Free Thiol Groups and Disulfide Bonds in Suspensions of Solubilized and Particulate Cereal Proteins," Cereal Chem, vol. 70, pp. 22-26 (1993).
Chueh et al., "Therapeutic strategy for hair regeneration: Hair cycle activation, niche environment modulation, wound-induced follicle neogenesis and stem cell engineering," Expert Opin. Biol. Ther. vol. 13(3), pp. 377-391 (2013).
Coenye et al., "Biofilms in Skin Infections: Propionibacterium acnes and Acne Vulgaris," Infectious Disorders-Drug Targets (Formerly Current Drug Targets-Infectious Disorders), vol. 8, pp. 156-159 (2008).
Crockett et al., "Isotretinoin Use and the Risk of Inflammatory Bowel Disease: A Case Control Study," The American Journal of Gastroenterology, vol. 105, pp. 1986-1993 (2010).
Demir et al., Ind Eng Chem Res, vol. 54, pp. 10731-10739 (2015).
Dreno et al., "Epidemiology of Acne," Dermatology, vol. 206, pp. 7-10 (2003).
Dreno et al., "European recommendations on the use of oral antibiotics for acne," Eur. J. Dermatol., vol. 14, pp. 391-399 (2004).
Ghodsi et al., "Prevalence, severity, and severity risk factors of acne in high school pupils: a community-based study," J. Invest. Dermatol., vol. 129, pp. 2136-2141 (2009).
Gollnick et al., "Can We Define Acne as a Chronic Disease?: If So, How and When?," Am. J. Clin. Dermatol., vol. 9, pp. 279-284 (2008).
Kogan et al., "Hyaluronic acid: a natural biopolymer with a broad range of biomedical and industrial applications," Biotechnol. Lett., vol. 29, pp. 17-25 (2007).
Krishnan et al., "Graphene Oxide Assisted Hydrothermal Carbonization of Carbon Hydrates," ACS Nano, vol. 8, No. 1, pp. 449-457 (2014).
Lanzalaco et al., "Poly(n-isopropylacrylamide) and Copolymers: A Review on Recent Progresses in Biomedical Applications," Gels, vol. 3, p. 36, (2017).
Lee et al., "Dissolving microneedles for transdermal drug delivery," Biomaterials, vol. 29, pp. 2113-2124 (2008).
Liang et al., "Intrastromal injection of antibiotic agent in the management of recalcitrant bacterial keratitis." J Cataract Refract Surg. vol. 37, pp. 960-962 (2011).
Lolli et al., "Androgenetic alopecia: a review," Endocrine, vol. 57, pp. 9-17 (2017).
Lookingbill et al., "Treatment of acne with a combination clindamycin/benzoyl peroxide gel compared with clindamycin gel, benzoyl peroxide gel and vehicle gel: combined results of two double-blind investigations," J. Am. Acad. Dermatol., vol. 37, pp. 590-595 (1997).
Lu et al., "Bioresponsive materials," Nature Reviews Materials, vol. 2, Article No. 16075 (2017).
Luan et al., "Engineering exosomes as refined biological nanoplatforms for drug delivery," Acta Pharmacologica Sinica, vol. 38, pp. 754-763 (2017).
McCarty et al., "Self-complementary recombinant adeno-associated virus (scAAV) vectors promote efficient transduction independently of DNA synthesis." Gene Ther. vol. 8, pp. 1248-1254 (2001).
Mohan et al., "Gene transfer into rabbit keratocytes using AAV and lipid-mediated plasmid DNA vectors with a lamellar flap for stromal access." Exp Eye Res. vol. 76(3), pp. 373-383 (2003).
Mohan et al., "Vector delivery technique affects gene transfer in the cornea in vivo." Mol Vis. vol. 16, pp. 2494-2501 (2010).
Moore et al., "Stem Cells and Their Niches," Science, vol. 311, pp. 1880-1885 (2006).
Müller-Röver et al., "A Comprehensive Guide for the Accurate Classification of Murine Hair Follicles in Distinct Hair Cycle Stages ," J. Investig. Dermatol., vol. 117(1), pp. 3-15 (2001).
Nagy et al., "Propionibacterium acnes and lipopolysaccharide induce the expression of antimicrobial peptides and proinflammatory cytokines/chemokines in human sebocytes," Microb. Infect., vol. 8, pp. 2195-2205 (2006).

(56) References Cited

OTHER PUBLICATIONS

Netto et al., "Wound healing in the cornea: a review of refractive surgery complications and new prospects for therapy." Cornea. vol. 24(5), pp. 509-522 (2005).
Niki et al., "Ineffectiveness of intrastromal voriconazole for filamentous fungal keratitis." Clin Ophthalmol. 2014:8, pp. 1075-1079, (2014).
Notice of Publication of Application corresponding to Publication No. US 2021/0162097 A1.
Notice of Publication of Application corresponding to Publication No. US 2021/0236336 A1.
Notice of Publication of Application corresponding to Publication No. US 2021/0161968 A1.
Oh et al., "A Guide to Studying Human Hair Follicle Cycling In Vivo," J. Investig. Dermatol., vol. 136(1), pp. 34-44 (2016).
Okiel et al., "Treatment of oil-water emulsions by adsorption onto activated carbon, bentonite and deposited carbon," Egyptian Journal of Petroleum, vol. 20, pp. 9-15 (2011).
Pace et al., "A Human Hair Keratin Hydrogel Scaffold Enhances Median Nerve Regeneration in Nonhuman Primates: An Electrophysiological and Histological Study." Tissue Engineering Part A, vol. 20, pp. 507-515 (2014).
Prakash et al., "Evaluation of Intrastromal Injection of Voriconazole as a Therapeutic Adjunctive for the Management of Deep Recalcitrant Fungal Keratitis." Am J Ophthalmol. vol. 146(1), pp. 56-59 (2008).
Prausnitz et al., "Transdermal drug delivery," Nat. Biotechnol., vol. 26, pp. 1261-1268 (2008).
Prausnitz, "Microneedles for transdermal drug delivery," Adv. Drug Del. Rev., vol. 56, pp. 581-587 (2004).
Rademaker, "Adverse effects of isotretinoin: A retrospective review of 1743 patients started on isotretinoin," Australas. J. Dermatol., vol. 51, pp. 248-255 (2010).
Rajendran et al., "Extracellular vesicles derived from MSCs activates dermal papilla cell in vitro and promotes hair follicle conversion from telogen to anagen in mice." Scientific Reports, vol. 5, Article No. 15560 (2017).
Saravanakumar et al., "Reactive-Oxygen-Species-Responsive Drug Delivery Systems: Promises and Challenges," Adv Sci (Weinh) vol. 4(1), Article ID 1600124 (2017).
Schaefer et al., "Sustained Release of Protein Therapeutics from Subcutaneous Thermosensitive Biocompatible and Biodegradable Pentablock Copolymers (PTS gels)." J Drug Deliv. vol. 2016, Article ID 2407459, pp. 1-15 (2016).
Sevilla & Fuertes, "The production of carbon materials by hydrothermal carbonization of cellulose," Carbon, vol. 47, pp. 2281-2289 (2009).
Simon & Gogotsi, "Capacitive Energy Storage in Nanostructured Carbon-Electrolyte Systems," Accounts of Chemical Research, vol. 46, pp. 1094-1103 (2013).
Song et al., "Serotype survey of AAV gene delivery via subconjunctival injection in mice." Gene Ther., vol. 25(6), pp. 402-414 (2018).
Teh et al., "ZnCl2/NaCl-Catalysed Hydrothermal Carbonization of Glucose and Oil Palm Shell Fiber," Nanosci Nanotech Lett, vol. 7, pp. 611-615 (2015).
Thiboutot et al., "An aqueous gel fixed combination of clindamycin phosphate 1.2% and benzoyl peroxide 2.5% for the once-daily treatment of moderate to severe acne vulgaris: Assessment of efficacy and safety in 2813 patients," J. Am. Acad. Dermatol., vol. 59, pp. 792-800 (2008).
Toyoda et al., "Pathogenesis of acne," Med. Electron Microsc., vol. 34, pp. 29-40 (2001).
Tsai et al., "Characterization and adsorption properties of diatomaceous earth modified by hydrofluoric acid etching," J. Colloid Interface Sci., vol. 297, pp. 749-754 (2006).
Tsai et al., "Inducible Adeno-Associated Virus Vector—Delivered Transgene Expression in Corneal Endothelium." Inv. Ophth. & Vis. Sci., vol. 43(3), pp. 751-757 (2016).
Tuchayi et al., "Acne vulgaris," Nature Reviews Disease Primers, vol. 1, Article No. 15029 (2015).
Voss, "Acne Vulgaris and Free Fatty Acids: A Review and Criticism," Arch. Dermatol., vol. 109, pp. 894-898 (1974).
Vowels et al., "Induction of proinflammatory cytokines by a soluble factor of Propionibacterium acnes: implications for chronic inflammatory acne.," Infect. Immun. vol. 63, pp. 3158-3165 (1995).
Wang et al., "Core-shell microneedle gel for self-regulated Insulin delivery," ACS Nano, vol. 12(3), pp. 2466-2473 (2018).
Webster et al., "Characterization of serum-independent polymorphonuclear leukocyte chemotactic factors produced by Propionibacterium acnes," Inflammation, vol. 4, pp. 261-269 (1980).
Webster, "Inflammation in acne vulgaris," J. Am. Acad. Dermatol., vol. 33, pp. 247-253 (1995).
Williams et al., "Acne vulgaris," The Lancet, vol. 379, pp. 361-372 (2012).
Xiao et al., Hydrothermal carbonization of lignocellulosic biomass, Bioresource Technology, vol. 118, pp. 619-623 (2012).
Yazici et al., "Disease-specific quality of life is associated with anxiety and depression in patients with acne," J. Eur. Acad. Dermatol. Venereol., vol. 18, pp. 435-439 (2004).
Yu et al., "Microneedle-array patches loaded with hypoxia-sensitive vesicles provide fast glucose-responsive insulin delivery," Proceedings of the National Academy of Sciences, vol. 112, pp. 8260-8265 (2015).
Zhang et al., "Bioresponsive Microneedles with a Sheath Structure for H2O2 and pH Cascade-Triggered Insulin Delivery," Small, vol. 14(14) (2018).
Zhang et al., "Cellulose Nanofibrils: From Strong Materials to Bioactive Surfaces," Journal of Renewable Materials, vol. 1, No. 3, pp. 195-211 (2013).
Zhang et al., "HucMSC-Exosome Mediated-Wnt4 Signaling Is Required for Cutaneous Wound Healing," Stem Cells, vol. 33, pp. 2158-2168 (2015).
Zhang et al., "Locally Induced Adipose Tissue Browning by Microneedle Patch for Obesity Treatment," ACS nano, vol. 11, pp. 9223-9230 (2017).
Zhang et al., "Thrombin-Responsive Transcutaneous Patch for Auto-Anticoagulant Regulation," Adv. Mater., vol. 29 (2017).
Zouboulis et al., "What is the pathogenesis of acne?," Exp. Dermatol. vol. 14, pp. 143-152 (2005).
Gollnick et al., "Topical Drug Treatment in Acne," Dermatology, vol. 196, pp. 119-125 (1998).
Gollnick et al., "Topical Treatment in Acne: Current Status and Future Aspects," Dermatology, vol. 206, pp. 29-36 (2003).
Habibi et al., "Cellulose Nanocrystals: Chemistry, Self-Assembly, and Applications," Chem Rev, vol. 110, pp. 3479-3500 (2010).
Halvorsen et al., "Suicidal Ideation, Mental Health Problems, and Social Impairment Are Increased in Adolescents with Acne: A Population-Based Study" J. Invest. Dermatol., vol. 131, pp. 363-370 (2011).
Hashemian et al., "Deep intrastromal bevacizumab injection for management of corneal stromal vascularization after deep anterior lamellar keratoplasty, a novel technique." Cornea. Vol. 30, pp. 215-218 (2011).
Hennig et al., "AAV-mediated intravitreal gene therapy reduces lysosomal storage in the retinal pigmented epithelium and improves retinal function in adult MPS VII mice." Mol Ther. vol. 10, pp. 106-116 (2004).
Hippert et al., "Corneal transduction by intra-stromal injection of AAV vectors in vivo in the mouse and Ex vivo in human explants." PLoS One. vol. 7, Article ID e35318 (2012).
Hirsch et al., "AAV vector-meditated expression of HLA-G reduces injury-induced corneal vascularization, immune cell infiltration, and fibrosis." Sci Rep., vol. 7(1), Article 17840 (2017).
Hirsch et al., "Oversized AAV transductifon is mediated via a DNA-PKcs-independent, Rad51C-dependent repair pathway." Mol Ther. vol. 21, pp. 2205-2216 (2013).
Hsu et al., "Dynamics between Stem Cells, Niche, and Progeny in the Hair Follicle," Cell, vol. 144, pp. 92-105 (2011).
Hsu et al., "Emerging interactions between skin stem cells and their niches," Nature Medicine, vol. 20, pp. 847-857 (2014).
Hu et al., "A Combination of Intrastromal and Intracameral Injections of Amphotericin B in the Treatment of Severe Fungal Keratitis." J Ophthalmol. vol. 2016, Article ID 3436415 (2016).

(56) References Cited

OTHER PUBLICATIONS

Jacob et al., "Acne scarring: A classification system and review of treatment options," J. Am. Acad. Dermatol., vol. 45, pp. 109-117 (2001).

Jiang et al., "Exosomes Mediate Epithelium—Mesenchyme Crosstalk in Organ Development," ACS Nano, vol. 11, pp. 7736-7746 (2017).

Johnson et al., "Enhancement of Adeno-Associated Virus Infection by Mobilizing Capsids into and Out of the Nucleolus." J Virol. vol. 83, pp. 2632-2644 (2009).

Kamata et al., "Adenovirus-mediated gene therapy for corneal clouding in mice with mucopolysaccharidosis type VII." Mol Ther. vol. 4, pp. 307-312 (2001).

Kim, "Review of the Innate Immune Response in Acne vulgaris: Activation of Toll-Like Receptor 2 in Acne Triggers Inflammatory Cytokine Responses," Dermatology, vol. 211, pp. 193-198 (2005).

Hirata et al., "Design and Packaging of Adeno-Associated Virus Gene Targeting Vectors." J Virol. vol. 74, pp. 4612-4620 (2000).

* cited by examiner

SYNTHESIS OF MICRON AND NANOSCALE CARBON SPHERES AND STRUCTURES USING HYDROTHEMAL CARBONIZATION

RELATED APPLICATIONS

The presently disclosed subject matter claims priority to and the benefit of U.S. Provisional Patent Application Ser. No. 62/631,108, filed Feb. 15, 2018, the disclosure of which is incorporated herein by reference in its entirety.

TECHNICAL FIELD

The presently disclosed subject matter relates to methods for preparing cellulose-based carbon powders and methods for using the same.

BACKGROUND

Carbon in various physical forms, including powders and fibers, has been used in many different industries. Fine carbon powders (micro- and/or nanoscale) can be used for many applications ranging from dry lubricants, carbon brushes, polymer additives, and $CO_2$ capture materials, to crucial components in lithium-ion batteries and future carbon-ion batteries. The cost of these materials and the size of the powders still present challenges from a commercial perspective. New lower cost and more sustainable alternatives for manufacturing carbon powders would be highly desirable and topical.

SUMMARY

In some embodiments, the presently disclosed subject matter provides methods for preparing carbon powders from cellulose-containing liquids. In some embodiments, the methods comprise exposing a cellulose-containing liquid to a hydrothermal carbonization process to convert carbonaceous material present therein into a carbon powder. In some embodiments, the cellulose-containing liquid comprises about 5% micro- and/or nanofibrillated cellulose by weight in water. In some embodiments, the cellulose-containing liquid comprises agricultural waste residue, such as soybean waste residue. In some embodiments, the carbonaceous material present in the cellulose-containing liquid comprises cellulose nanocrystals (CNCs), optionally wherein the CNCs have been generated from plant cellulose pulp by acid hydrolysis.

In some embodiments of the presently disclosed subject matter, the hydrothermal carbonization process is performed under conditions sufficient to carbonize at least 60%, at least 65%, at least 70% but less than 95%, less than 90%, less than 85%, less than 80%, or less than 75% of the carbonaceous material present in the cellulose-containing liquid.

In some embodiments of the presently disclosed subject matter, the hydrothermal carbonization process comprises exposing the cellulose-containing liquid to the hydrothermal carbonization process at temperatures from about 180° C. to 350° C. In some embodiments, the cellulose-containing liquid is subjected to a hydrothermal carbonization at temperatures in the range from about 180° C. to about 250° C., optionally 250° C. or optionally 225° C.

In some embodiments of the presently disclosed subject matter, the hydrothermal carbonization process comprises exposing the cellulose-containing liquid to the hydrothermal carbonization process in a closed reactor at a temperature of about 250° C. for about 25 minutes before allowing the processed material to cool to room temperature.

In some embodiments of the presently disclosed subject matter, performing the hydrothermal carbonization process in the closed reactor results in an autogenous pressure of about 10 to about 50 bars within the closed reactor.

The carbon powder of the presently disclosed subject matter can be nanosized or microsized. By way of example and not limitation, the carbon powder of the presently disclosed subject matter can have an average grain size of in some embodiments about 100 nm or less, in some embodiments about 250 nm or less, in some embodiments about 500 nm or less, in some embodiments about 750 nm or less, in some embodiments about 1000 nm or less, in some embodiments about 1.25 µm or less, in some embodiments about 1.5 m or less, in some embodiments about 2.0 µm or less, and in some embodiments about 5.0 µm or less.

In some embodiments of the presently disclosed subject matter, the carbon powder is appropriate for use in a metal-carbon composite, an activated carbon such as but not limited to for $CO_2$ capture, an active surface, a structural composite, an absorbent, in an electronics application, and/or for energy storage.

In some embodiments of the presently disclosed subject matter, the hydrothermal carbonization process is a batch hydrothermal carbonization process. In some embodiments, the hydrothermal carbonization process is a continuous hydrothermal carbonization process.

In some embodiments of the presently disclosed subject matter, the presently disclosed methods further comprise separating the carbon powder from liquid containing the carbon powder after the hydrothermal carbonization process is performed. In some embodiments, the liquid containing the carbon powder comprises one or more chemicals of interest such as but not limited to furfurals and small organic acids after the hydrothermal carbonization process is performed. In some embodiments, the presently disclosed methods further comprise isolating at least one of the one or more chemicals of interest from the liquid after the hydrothermal carbonization process is performed.

The presently disclosed subject matter also provides in some embodiments carbon powders produced by any of the presently disclosed methods.

The presently disclosed subject matter also provides in some embodiments methods for producing carbon powder-containing polymer matrices. In some embodiments, the methods comprise adding a carbon powder as disclosed herein to a polymer matrix. In some embodiments, the polymer matrix is selected from the group consisting of a polysiloxane, a polysulfonate, a poly(caprolactone), a styrene, a butyl acrylate latex, a poly(oxyethylene), a poly (styrene-co-butyl acrylate) (poly(S-co-BuA)), a cellulose acetatebutyrate, a carboxymethyl cellulose, a poly(vinyl alcohol), a poly(vinyl acetate), a poly(ethylene-vinyl acetate)(EVA), an epoxide, a polyethylene, a polypropylene, or any combination thereof.

The presently disclosed subject matter also provides in some embodiments methods for producing activated carbon powders. In some embodiments, the methods comprise exposing a carbon powder as disclosed herein to an activation process. In some embodiments, the activation process comprises exposure of the carbon powder to steam at a temperature of at least 800° C. In some embodiments, the activation process comprises chemical activation of the carbon powder, which in some embodiments comprises chemical activation of the carbon powder with phosphoric acid and zinc trichloride treated with sodium hydroxide.

The presently disclosed subject matter also provides in some embodiments compositions comprising carbon powders derived from nanofibrillated cellulose (NFC) and/or microfibrillated cellulose (MFC) and/or derived from agricultural waste residue, such as soybean waste residue. In some embodiments, the carbon powders comprise, consist essentially of, or consist of substantially spherical carbonized structures or species with an average diameter of less than about 5 μm and/or aggregates thereof. In some embodiments, the carbon content of the carbon powder is at least about 60%, about 65%, about 70%, about 75%, about 80%, about 85%, about 90%, or about 95% by weight of the carbon powder. In some embodiments, the carbon content of the carbon powder is in a range selected from the group consisting of about 60% to about 95%, about 60% to about 85%, about 65% to about 85%, and about 65% to about 70% by weight of the carbon powder. In some embodiments, the hydrogen content of the carbon powder is about 4% to about 6% by weight of the carbon powder. In some embodiments, the nitrogen content of the carbon powder is less than about 0.05% by weight of the carbon powder, optionally less than 0.02% by weight of the carbon powder.

Also provided are activated carbon products that comprise an activated form of a carbon powder derived from (i.e., prepared from, for example by HTC) nanofibrillated cellulose (NFC) and/or microfibrillated cellulose (MFC) and/or agricultural waste residue, as set forth herein. It is recognized that in some embodiments, the starting material carbon powder can have a carbon content that is at least about 60%, about 65%, about 70%, about 75%, about 80%, about 85%, about 90%, or about 95% by weight of the carbon powder; and/or is in a range selected from the group consisting of about 60% to about 95%, about 60% to about 85%, about 65% to about 85%, and about 65% to about 70% by weight of the carbon powder; a hydrogen content that is about 4% to about 6% by weight of the carbon powder; and/or a nitrogen content that is less than about 0.05% by weight of the carbon powder, optionally less than 0.02% by weight of the carbon powder, and that activation of the carbon powder can alter these parameters in a way that might render the carbon content, the hydrogen content, and/or the nitrogen content to be different from, and in some embodiments outside of, the initial values. Such activated carbon powders are nonetheless considered within the scope of the presently disclosed subject matter.

In some embodiments, a method for preparing a carbon powder from a cellulose-containing liquid is disclosed. In some embodiments, the method comprises exposing the cellulose-containing liquid to a hydrothermal carbonization process to convert carbonaceous material present therein into a carbon powder; and exposing the carbon powder to an activation process, optionally wherein the activation process is selected from the group consisting of exposure to steam at a temperature of at least 800° C. and chemical activation, optionally chemical activation with phosphoric acid and zinc trichloride treated with sodium hydroxide. In some embodiments, the cellulose-containing liquid comprises about 5% micro- and/or nanofibrillated cellulose by weight in water or wherein the cellulose-containing liquid comprises agricultural waste residue. In some embodiments, the agricultural waste residue has been refined. In some embodiments, the cellulose present in the cellulose-containing liquid comprises cellulose nanocrystals (CNCs), optionally wherein the CNCs have been generated from plant cellulose pulp by acid hydrolysis.

In some embodiments, the hydrothermal carbonization process is performed under conditions sufficient to carbonize at least 60%, at least 65%, at least 70% but less than 95%, less than 90%, less than 85%, less than 80%, or less than 75% of the carbonaceous material present in the cellulose-containing liquid. In some embodiments, the hydrothermal carbonization process comprises exposing the cellulose-containing liquid to the hydrothermal carbonization process at temperatures from about 170° C. to 350° C. In some embodiments, the cellulose-containing liquid is subjected to a hydrothermal carbonization at temperatures in the range from about 180° C. to about 250° C., optionally 250° C. In some embodiments, the hydrothermal carbonization process comprises exposing the cellulose-containing liquid to the hydrothermal carbonization process in a closed reactor at a temperature of about 250° C. for about 25 minutes before allowing the processed material to cool to room temperature. In some embodiments, performing the hydrothermal carbonization process in the closed reactor results in an autogenous pressure of about 10 to about 50 bars within the closed reactor.

In some embodiments, the carbon powder has an average grain size of about 100 nm or less, about 250 nm or less, about 500 nm or less, about 750 nm or less, about 1000 nm or less, about 1.25 μm or less, about 1.5 m or less, about 2.0 μm or less, or about 5.0 μm or less. In some embodiments, the carbon powder is appropriate for use in a metal-carbon composite, an activated carbon such as but not limited to for $CO_2$ capture, an active surface, a structural composite, an absorbent, in an electronics application, and/or for energy storage.

In some embodiments, wherein the hydrothermal carbonization process is a batch hydrothermal carbonization process. In some embodiments, the hydrothermal carbonization process is a continuous hydrothermal carbonization process.

In some embodiments, the method further comprises separating the carbon powder from liquid containing the carbon powder after the hydrothermal carbonization process is performed. In some embodiments, the liquid containing the carbon powder comprises one or more chemicals of interest such as but not limited to furfurals and small organic acids after the hydrothermal carbonization process is performed. In some embodiments, the method further comprises isolating at least one of the one or more chemicals of interest from the liquid after the hydrothermal carbonization process is performed.

In some embodiments a carbon powder produced by any of the presently discloses methods is provided.

Thus, it is an object of the presently disclosed subject matter to provide methods for preparing carbon powders from cellulose-containing liquids.

An object of the presently disclosed subject matter having been stated herein above, and which is achieved in whole or in part by the presently disclosed subject matter, other objects will become evident as the description proceeds when taken in connection with the accompanying Figures as best described herein below.

BRIEF DESCRIPTION OF THE FIGURES

FIG. 4A is an XPS plot of an HTC run at 160° C. FIG. 4B is an XPS plot of an HTC run at 200° C. FIG. 4C is an XPS plot of the Black Side for an HTC run at 225° C. FIG. 4D is an XPS plot of the Bown Side for an HTC run at 225° C. FIG. 4E is an XPS plot of an HTC run at 250° C.

DETAILED DESCRIPTION

Figure 1:
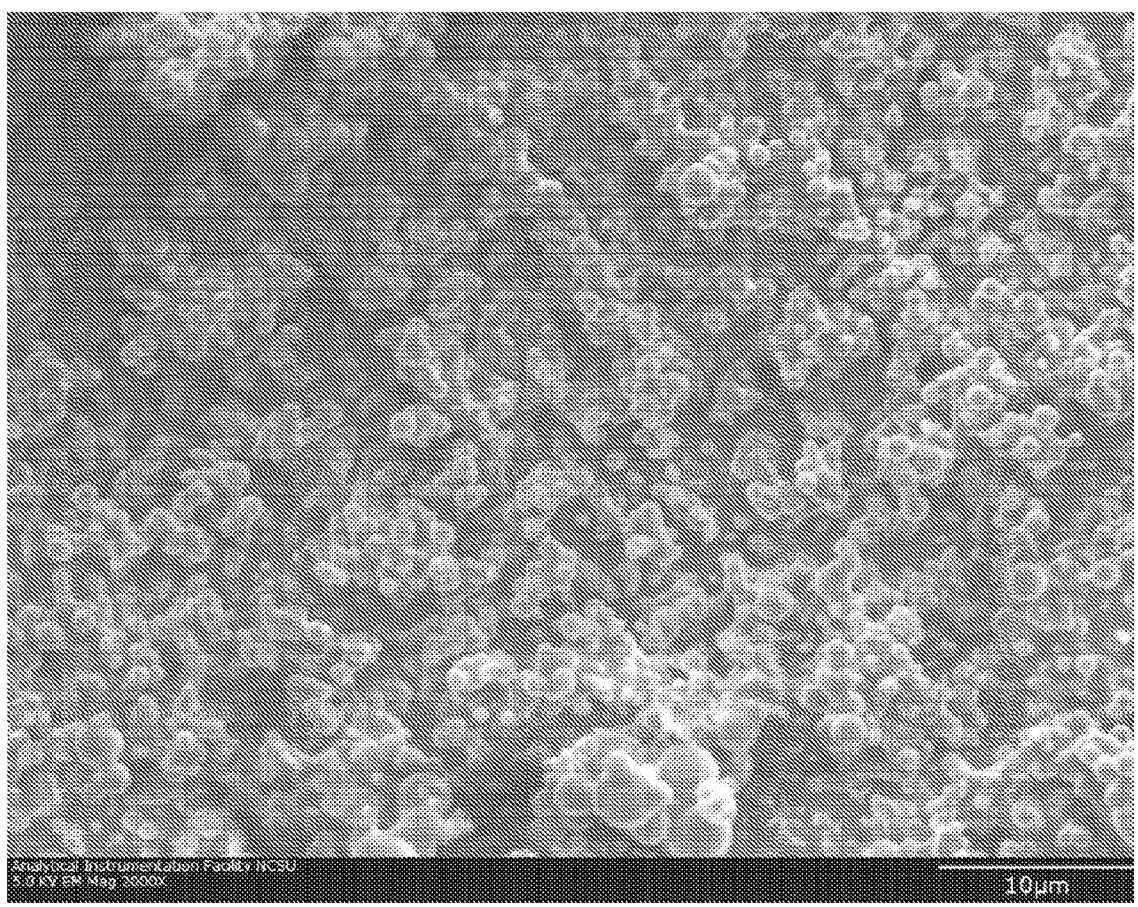
FIGS. 1 and 2 are scanning electron microscope (SEM) pictures of nanofibrillated cellulose (NFC)/microfibrillated cellulose (MFC) processed with an hydrothermal carbonization (HTC) method of the presently disclosed subject matter. Magnifications in FIGS. 2 and 3 are 2000× and 50,000×, respectively. Scale bars for FIGS. 2 and 3 are 10 μm and 1 μm, respectively.

The presently disclosed subject matter relates, in general, to methods for preparing a carbon powder from a source of cellulose, such as a cellulose-containing liquid. More particularly, the presently disclosed subject matter relates to hydrothermal carbonization of cellulose, including cellulose-containing liquids, and carbon powders generated therefrom.

Nanofibrillated Cellulose (NFC) and Microfibrillated Cellulose (MFC) are nano sized and micro sized natural fibers (e.g., from wood) and represent sustainable materials for many applications. A manufactured product (NFC/MFC) is commercially available in an aqueous form, typically a 5% consistency aqueous suspension. The direct uses of NFC/MFC are mainly for paperboard source reduction, barrier coating, and composite development.

Generally, NFC/MFC production is based on grinding aqueous dispersion of pulp fibers. The concentration of NFC/MFC in such dispersions is typically low, usually around 1-5%. As such, the production of NFC/MFC by fibrillating cellulose into nano-sized fibers requires extensive mechanical treatment. Through the mechanical fibrillating process, the fibrillated cellulose achieves a "gel-point" after repeated passes. The gel-point is characterized by a critical point in the process at which the cellulosic suspension rapidly thickens, adopting a more viscous consistency. Stated another way, the viscosity of the pulp fiber suspension increases dramatically during the process. Therefore, after the grinding or homogenization process, the obtained NFC/MFC is a dilute viscoelastic hydrogel.

Hydrothermal carbonization (HTC) is a wet thermo-chemical conversion process that can be used in the production of a coal-like product called hydrochar. This process is also called "wet pyrolysis" or "wet torrefaction," and can be applied to a variety of wet biomass. One of its main benefits of this approach is that the feedstock used can be wet-based, thereby eliminating the need for drying prior the conversion process. The HTC process is typically performed in a high-pressure vessel by using relatively high temperature (180° C.-350° C.) and high autogenous pressures (10-50 bars). This technology is currently emerging from lab scale to industrial use.

Disclosed herein for the first time are methods for using Hydrothermal Carbonization (HTC), a wet thermo-chemical conversion process, to process biomass, such as NFC/MFC cellulose and agricultural waste residue, such as soybean husks, and creating fine (e.g., nano/macro scale) carbon powders. This process enables a sustainable, large capacity, and low-cost way of producing fine carbon powders. There remains an existing and growing need for carbon powders within the plastics, electronics, paint, and batteries industries, as well as others. In addition, opportunities exist in the direction and push from the pulp and paper producers and other bioeconomy players to find large scale and high value applications for forest-based biomaterials such as NFC/MFC and agricultural waste residue such as soybean hulls.

HTC processing of agricultural waste residue, such as soybean hulls and strings, for value-added products is an approach to waste-to-value creation that forms an aspect of the presently disclosed subject matter. In some embodiments, low and medium value hydrochar is produced from soybean hulls and strings. In some embodiments, high value carbon applications are produced from soybean hulls and strings. Processing soybean hulls and strings for agricultural hydrochar product is carried out as described elsewhere herein and includes process parameter optimization and materials characterization. In some embodiments, carbon black is also developed because of similarities in its structure and chemical properties to hydrochar.

I. Definitions

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

Definitions of specific functional groups and chemical terms are those that would be understood by one of ordinary skill in the art. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in, for example, Sorrell, 2006; Smith & March, 2001; Larock, 1989; and Carruthers, 1986; the entire contents of each of which are incorporated herein by reference.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

Following long-standing patent law tradition, the terms "a", "an", and "the" are meant to refer to one or more as used herein, including the claims. For example, the phrase "a solvent" can refer to one or more solvents. Also as used herein, the term "another" can refer to at least a second or more.

The term "about", as used herein when referring to a measurable value such as an amount of weight, time, etc., is meant to encompass variations of in some embodiments ±20%, in some embodiments ±10%, in some embodiments, ±5%, in some embodiments ±1%, and in some embodiments ±0.1% from the specified amount, as such variations are appropriate to perform the disclosed methods.

The use of the term "or" in the claims is used to mean "and/or" unless explicitly indicated to refer to alternatives only or the alternatives are mutually exclusive.

As used herein, the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, "significance" or "significant" relates to a statistical analysis of the probability that there is a non-random association between two or more occurrences. To determine whether or not a relationship is "significant" or has "significance", statistical manipulations of the data can be performed to calculate a probability, expressed as a "p-value". Those p-values that fall below a user-defined cutoff point are regarded as significant. In some embodiments, a p-value less than or equal to 0.10, in some embodiments less than or equal to 0.05, in some embodiments less than or equal to 0.01, in some embodiments less than or equal to 0.005, and in some embodiments less than or equal to 0.001, are regarded as significant.

II. Methods for Preparing Carbon Powders

In some embodiments, the presently disclosed subject matter provides methods for preparing carbon powders, optionally activated carbon powders, from cellulose-containing liquids.

As used herein, the phrase "cellulose-containing liquid" refers to any solution or suspension that comprises cellulose as a potential source of carbon. In some embodiments, cellulose per se is only one carbon source in the cellulose-containing liquid. For example, it is known that biological materials such as plants or other biomass can be used to generate cellulose-containing liquids, and further that these biomass-derived liquids can also contain hemicellulose, lignin, and other compounds. These biomass-derived liquids are also considered within the scope of the phrase "cellulose-containing liquids". Indeed, in some embodiments, the cellulose-containing liquids contain cellulose, hemicellulose, lignin, and other compounds. In some embodiments, the cellulose-containing liquids are derived from biomass and contain cellulose, hemicellulose, lignin, and other compounds. In some embodiments, the biomass comprises agricultural waste residue, such as soybean waste residue, such as soybean husks and/or strings.

In the methods of the presently disclosed subject matter, the carbon source(s) in the cellulose-containing liquid is/are used to prepare a carbon powder by exposing the cellulose-containing liquid to a hydrothermal carbonization (HTC) process, which converts the cellulose and other carbon sources present therein into a carbon powder, which can also be referred to as "hydrochar". Any cellulose-containing liquid can be exposed to the HTC process, including but not limited to NFC/MFC, cellulose nanocrystals (CNCs), including CNCs produced from NFC/MRC by acid hydrolysis, agricultural waste residue, etc. In some embodiments, the cellulose-containing liquid comprises about 1-5% micro- and/or nanofibrillated cellulose by weight in water.

As used herein, the phrase "hydrothermal carbonization" (HTC) refers to a process that employs heat and pressure to convert organic compounds to carbon species. HTC is also referred to as "wet pyrolysis" or "wet torrefaction", and was first described by Bergius in 1913, and the basic process is well known to those of skill in the art (see e.g., U.S. Pat. Nos. 8,414,664; 8,637,718; 9,109,180; 9,238,583; 9,718, 717; Sevilla & Fuertes, 2009; Xiao et al., 2012; each of which is incorporated herein in its entirety as well as all references cited therein). Exemplary, non-limiting parameters for HTC include exposing a cellulose-containing liquid to temperatures from about 170° C. to 350° C., optionally about 180° C. to about 250° C., and further optionally 225° C. or 250° C. in a closed reactor for about 10-60 minutes, optionally 25 minutes, 30 minutes 35 minutes, 40 minutes, 45 minutes, 50 minutes, 55 minutes, or 60 minutes, before allowing the processed material to cool to room temperature. Performing the hydrothermal carbonization process in the closed reactor can in some embodiments result in an autogenous pressure of about 10 to about 50 bars within the closed reactor.

The presently disclosed methods can employ both continuous and batch HTC processes. Methods for continuous and batch HTC processes are disclosed in the references cited herein above as well as in U.S. Patent Application Publication Nos. 2017/0197858 and 2017/0210625, each of which is incorporated herein in its entirety.

When the cellulose-containing liquid exposed to the HTC process comprises NFC/MFC, the result is a carbon powder containing micro- and/or nanoscale carbon spheres. The overall sizes of the carbon spheres can be adjusted by varying the parameters under which the HTC process is performed. In some embodiments, longer heating times and/or higher temperatures can result in reductions in the mean size of the carbon spheres, although the use of NFC/MFC that itself has relatively larger or smaller fibrils can also influence the mean size of the carbon spheres that result from the HTC process. In some embodiments, the carbon powder produced by the presently disclosed methods has an average grain size of about 100 nm or less, in some embodiments about 250 nm or less, in some embodiments about 500 nm or less, in some embodiments about 750 nm or less, in some embodiments about 1000 nm or less, in some embodiments about 1.25 µm or less, in some embodiments about 1.5 m or less, in some embodiments about 2.0 µm or less, and in some embodiments about 5.0 µm or less.

By way of example and not limitation, in some embodiments high value carbon materials are produced from nanofibrillated cellulose (NFC) via a hydrothermal carbonization process. In some embodiments, NFC can be obtained directly from manufacturing, wherein in some embodiments the NFC is approximately 95% water with a 5% fiber content. This NFC can be exposed to a hydrothermal carbonization processes, which in some embodiments can comprise heating the NFC to about 250° C. for 20-60 minutes, including about 25 minutes to about 45 minutes. The resulting powders have in some embodiments macro-sized carbon pores and structures with uses in many applications including, but not limited to the carbon/graphite powder markets. The resulting powders can in some embodiments also include volatile carbon fractions with thermal transformations of the structures. In some embodiments, the resulting powders are themselves high value hydrochars.

In some embodiments, the agricultural waste residue is refined, including refined to provide a micro- and/or nanoscale feedstock. In this case, the cellulose-containing liquid can comprise refined agricultural waste residue ranging from about 1% to about 10% by weight, including about 1%, about 2%, about 3%, about 4%, about 5%, about 6%, about 7%, about 8%, about 9% and about 10%. In some embodiments, the agricultural waste residue is used to generate micro- and/or nanoscale carbon spheres. Typically, in this case, the agricultural waste residue is refined (e.g., grinded) to very fine powder to provide this effect.

In some embodiments, the agricultural waste residue is not refined. In this case, the cellulose-containing liquid can comprise refined agricultural waste residue ranging from about 10% to about 30% by weight, including about 10%, about 15%, about 20%, about 25%, and about 30%.

In some embodiments, activation of the resulting powders can be desired, and this can be accomplished by standard techniques. In some embodiments, the activation is accomplished by using high-temperature (HT) steam, such as but not limited to steam at 800-900° C. Alternatively or in addition, chemical activation using, for example, phosphoric acid and zinc trichloride treated with sodium hydroxide can be employed. The resulting activated carbon is referred to as high value activated hydrochar and can be employed in various applications as disclosed herein including but not limited to air and water filtering, uses in batteries and other energy storage and delivery devices, and in supercapacitors.

In some embodiments, NFC/MFC and/or agricultural waste residue comprises cellulose, lignin, hemicellulose and other components. In the HTC process volatiles can come out of the nano- and micro-fibrillins and/or agricultural waste residue prior to full carbonization. This can impact the structure and the growth of the spheres and valleys within. By tuning the speed of the heating rate and the time keeping the treatment temperature steady, the presently disclosed subject matter can control the speed of the volatiles movements and deconstruction of the material. This then affects the morphology. See, e.g., FIGS. 1 and 2. Additionally, residence time in a desired temperature range can be used to control morphology. By way of example and not limitation, certain of the finest spherical structures have been observed to occur at around 225° C. and with at least 30 min. of treatment time.

It is noted that in an HTC process, volatiles are released from the NFC/MFC and/or agricultural waste residue prior to full carbonization. It is hypothesized that this release can influence the structure and the growth of the spheres and surface structures (e.g., valleys) thereof. In some embodiments, by tuning the speed of the heating rate and/or the duration at which the cellulose-containing liquid is maintained at the steady state temperature during the HTC process, it is possible to control the speed of the volatiles movements and the deconstruction of the material. This can then affect the morphology of the carbon spheres.

The HTC process can be agitated, such as by using a propeller stirring the NFC/MFC and/or agricultural waste residue during the process. However, this is not necessary and indeed in some case, is not advantageous. By way of elaboration but not limitation, it appears that the material becomes more condensed in the case of agitation. But again, the HTC process can be carried out with or without agitation.

As noted above, HTC technology is currently implemented in continuous processes and is easily adaptable to an industrial process. Further, an aspect of the presently disclosed subject matter is that the biomass does not need to be dried or to have the water content lower. Efforts to dry or lower water content are typically energy intensive and thus can be avoided in accordance with aspects of the presently disclosed subject matter. Thus, in some embodiments of the presently disclosed subject matter, continuous flow and biomass conversion without drying or lowering water contact afford added value biomass processing and products produced by biomass processing.

In some embodiments, the HTC employed is catalyzed HTC. As used herein, the phrase "catalyzed HTC" refers to an HTC method that employs a catalyst, such as but not limited to a metal, an acid, etc. In some embodiments, catalyzed HTC comprising employing citric acid in the catalysis. Also, with lower or acidic pH, the produced surface structure has a higher surface area than with higher or basic pH. Exemplary, non-limiting catalyzed HTC methods are disclosed in Demir et al., 2015 (use of metal nitrate catalyst including iron, cobalt, and manganese nitrates); and Teh et al., 2015 (use of a $ZnCl_2$/NaCl catalyst), each of which are incorporated herein by reference in its entirety. In some embodiments, catalyzed HTC is employed at lower temperatures, such as 170° C., 180° C., 190° C., and/or 200° C.

In some embodiments, the agricultural waste residue has been refined. In some embodiments, refining the agricultural waste residue comprise a mechanical refining in accordance with techniques that would be apparent to one of ordinary skill in the art upon a review of the instant disclosure. In some embodiments, the mechanical refining comprises a grinding process.

III. Methods for Producing Activated Carbon Powders

In some embodiments, the methods of the presently disclosed subject matter can be used to produce activated carbon powders and/or the carbon powders produced by the presently disclosed methods can be activated. In some embodiments, a method for producing an activated carbon powder of the presently disclosed subject matter comprises exposing a carbon powder as disclosed herein to an activation process. Any method for activing carbon can be used with the carbon powders of the presently disclosed subject matter, including but not limited to exposure of the carbon powder to steam at a temperature of at least 800° C. and/or chemical activation of the carbon powder, such as but not limited to chemical activation with phosphoric acid and zinc trichloride treated with sodium hydroxide. Exemplary methods are disclosed in U.S. Pat. Nos. 9,290,390; 9,359,390; 9,828,249; each of which is incorporated herein in its entirety as well as all references cited therein.

In some embodiments, the extent to which a carbon powder of the presently disclosed subject matter can be activated is based on the extent to which the powder is carbonized (e.g., the size, morphology, and extent to which the surface of the carbon spheres are structured). These characteristics of the carbon powders of the presently disclosed subject matter can be varied as set forth herein (e.g., by modifying the temperature at which the HTC process is carried out and/or the length of time thereof). Thus, in some embodiments the HTC process parameters are chosen to result in more or less carbonization of the carbon spheres in order to vary the extent to which the carbon can be activated. By way of example and not limitation, the hydrothermal carbonization process can be performed under conditions sufficient to carbonize at least 60%, at least 65%, at least 70% of the carbonaceous material present in the cellulose-containing liquid but in some embodiments less than 95%, in some embodiments less than 90%, in some embodiments less than 85%, in some embodiments less than 80%, and in some embodiments less than 75% of the carbonaceous material present therein.

As such, in some embodiments the presently disclosed subject matter provides methods for producing bio-based, highly activated, highly structuralized carbon powders. By way of example and not limitation, with activation it is possible to create aromatic carbon structure shapes and/or other morphologies in and/or on the surface of the carbon spheres. In this way, structure-within-structure can be generated in the spheres. By adding to this another dimension of the "spider web"-like aromatic c chain structures, a very high surface area material with a sustainable and lower cost pathway can be produced. It is known, for example, that adsorption of ions from an electrolyte in which an activated carbon structure is influenced by the features present on the surface of the activated carbon structure, which also controls the capacitance of the structure. In some embodiments, it can be advantageous to increase the capacitance of the activated carbon powder, which can be influences by the carbon/electrolyte interface. Thus, increasing the effective surface area per unit volume of an activated carbon powder can increase the capacitance of and/or the charged stored by the activated carbon powder.

IV. HTC-Generated Carbon Powders and Uses Thereof

The carbon powders and/or the highly activated, highly structuralized carbon powders (collectively referred to herein as "carbon powders") produced by the presently disclosed methods can be employed in any application for which carbon powders and/or activated carbon powders would otherwise be appropriate.

The presently disclosed subject matter also provides in some embodiments compositions comprising carbon powders derived from nanofibrillated cellulose (NFC) and/or microfibrillated cellulose (MFC) and/or derived from agricultural waste residue. In some embodiments, the carbon powders comprise, consist essentially of, or consist of substantially spherical carbonized structures or species with an average diameter of less than about 5 µm, in some embodiments less than about 2 µm, and/or aggregates thereof. In some embodiments, the carbon content of the carbon powder is at least about 60%, about 65%, about 70%, about 75%, about 80%, about 85%, about 90%, or about 95% by weight of the carbon powder. In some embodiments, the carbon content of the carbon powder is in a range selected from the group consisting of about 60% to about 95%, about 60% to about 85%, about 65% to about 85%, and about 65% to about 70% by weight of the carbon powder. In some embodiments, the hydrogen content of the carbon powder is about 4% to about 6% by weight of the carbon powder. In some embodiments, the nitrogen content of the carbon powder is less than about 0.05% by weight of the carbon powder, optionally less than 0.02% by weight of the carbon powder.

Exemplary, non-limiting uses of the presently disclosed carbon powders include use in metal-carbon composites, for production of activated carbons as well as for any uses in which an activated carbon might be appropriate, including but not limited to $CO_2$ capture, an active surface, a structural composite, an absorbent, in an electronics application, and/or for energy storage. By way of example and not limitation, carbon powders have been employed in the production of lithium batteries (see e.g., U.S. Pat. Nos. 9,318,773; 9,458,021; and 9,879,344, each of which is incorporated herein in its entirety along with all references cited therein), and the carbon powders of the presently disclosed subject matter can be employed in the same manner. Other energy-related applications in which the carbon powders of the presently disclosed subject matter can be employed include uses in supercapacitors, energy storage, and $CO_2$ capture (see Simon & Gogotsi, 2013, which is incorporated by reference in its entirety).

Additionally, the presently disclosed carbon powders can be employed for making carbon powder-containing polymer matrices. As such, in some embodiments the presently disclosed subject matter provides methods for producing a carbon powder-containing polymer matrix comprising adding a carbon powder (e.g., a highly activated, highly structuralized carbon powder as disclosed herein) to a polymer matrix. Any polymer matrix for which the addition of a carbon powder would be desired can be employed in the methods and compositions of the presently disclosed subject matter. Exemplary such polymer matrices include, but are not limited to polysiloxanes, polysufonates, poly(caprolactones), styrenes, butyl acrylate latexes, poly(oxyethylenes), poly(styrene-co-butyl acrylates) (poly(S-co-BuAs)), cellulose acetatebutyrates, carboxymethyl cellulose, a poly(vinyl alcohol), a poly(vinyl acetate), a poly(ethylene-vinyl acetates)(EVAs), epoxides, polyethylenes, polypropylenes, and/or any combination(s) thereof.

V. Other Applications

In some embodiments, the carbon powders can be used in agricultural applications, such as land remediation and/or fertilization.

In some embodiments, the carbon powders produced are separated from the liquid containing the carbon powder after the hydrothermal carbonization process is performed. The carbon powders can then be dried, activated, and/or otherwise treated as desired.

In some embodiments, the liquid in which the carbon powder was produced can comprise one or more chemicals of interest that are generated and/or otherwise liberated from the cellulosic material during the HTC process. Exemplary such chemicals of interest include but are not limited to furfurals and small organic acids. In some embodiments, at least one of the one or more chemicals of interest can be isolated from the liquid after the hydrothermal carbonization process is performed.

VI. Exemplary Embodiments

An exemplary process for preparing carbon powders, optionally activated carbon powders, from a representative cellulose-containing liquid, e.g., a cellulose-containing liquid comprising NFC or a cellulose-containing liquid comprising agricultural waste residue (e.g., soybean husks) as the feedstock. NFC can be obtained directly from a manufacturer as an aqueous suspension with in some embodiments 5% fiber content. Soybean husks and possible other residue waste can be obtained from soybean processing plants, such as those run by vendors like Valmet (Espoo, Finland), SunCoal Industries GmbH (Ludwigsfelde, Germany), and the like. Hydrothermal processing routes can typically feed sludge/biomass up to 30 wt. % solids.

The NFC or soybean residue waste is directly employed in a hydrothermal carbonization process, for example at 170° C. to 250° C. for 20 minutes to one hour. As a result of the HTC process, low to medium value hydrochar and/or high value hydrochar is/are produced. The low to medium value hydrochar can be used in agricultural applications, such as land remediation and/or fertilization. The high value hydrochar can comprise carbons spheres with macro-sized carbon pores and structures are produced, which can be used in various applications for which carbon/graphite powders are generally employed. Representative such applications include but are not limited to carbon black, catalyst carrier, electrode carbon, and/or nanocomposites. The HTC process also generates volatile carbon fractions, which together can result in thermal transformation of structures.

If an activated carbon powder is desired, the high value hydrochar can be activated by treating the same with high temperature steam (e.g., 800° C. to 900° C.), or alternatively by treating the same with a chemical activation process such as, but not limited to phosphoric acid and zinc trichloride treated with sodium hydroxide. The result of this step in an exemplary process in accordance with the presently disclosed subject matter is an activated carbon that can be employed, for example, in air and water filtering, batteries, food packaging, anti-microbial agents, nanoparticles, and supercapacitors, as well as other applications.

EXAMPLES

The following EXAMPLES provide illustrative embodiments. In light of the present disclosure and the general level of skill in the art, those of skill will appreciate that the following EXAMPLES are intended to be exemplary only and that numerous changes, modifications, and alterations can be employed without departing from the scope of the presently disclosed subject matter.

Example 1

HTC of NFC-RUN01

NFC was treated by HTC with a three (3) hour treatment at a maximum temperature of 160° C. The NFC barely progressed to any hydrothermal carbonization. A slight dark discoloration in random spots on the reacted material was observed. The darker char-like material in the pictures on the right is after the material came out of the drying oven.

Example 2

HTC of NFC-RUN02

NFC was treated by HTC with a three (3) hour treatment at a maximum temperature of 200° C. The NFC progressed through some hydrothermal carbonization. The liquid and solids were clearly separated once the reactor was opened. The clumpy sections appeared not to be carbonized. The final oven-dried material was very dark and very hard compared to NFC-Run03 (EXAMPLE 3).

Example 3

HTC of NFC-RUN03

NFC was treated by HTC with a three (3) hour treatment at a maximum temperature of 250° C. The NFC seemed to be completely reacted through hydrothermal carbonization. The solids were not clumpy and visible, and some oils seemed to be present on top of the liquid, which might have been hydrophilic parts of solids/solution or gases that were condensed from the maximum pressure in the vessel (612 psig). Some gases were bled off after the bath, as the pressure did not drop below 60 psig. The material was more brownish colored than in NFC-Run02 (EXAMPLE 2).

Example 4

HTC of NFC-RUN04

NFC was treated by HTC with a three (3) hour treatment at a maximum temperature of 225° C. The NFC seemed to be completely reacted through hydrothermal carbonization. The solids were not clumpy and visible, and some oils seemed to be on top of the liquid, which might have been hydrophilic parts of solids/solution or gases that were condensed from maximum pressure in the vessel (370 psig). Some gases were bled off after bath, as the pressure did not drop below 30 psig. The material was more black-colored than that of NFC-Run03 (EXAMPLE 3).

Table 1 summarizes element analysis of the HTC runs described in EXAMPLES 1-4.

TABLE 1

Elemental Analysis of HTC Runs at Different Run Temperatures

| Run Temp Deg C. | Carbon -wt. %- | Hydrogen -wt. %- | Nitrogen -wt. %- |
|---|---|---|---|
| 160 | 43.31 | 5.36 | <0.02 |
| 200 | 40.84 | 5.06 | <0.02 |
| 225 | 65.39 | 4.21 | <0.02 |
| 250 | 69.42 | 4.31 | <0.02 |

Example 5

Analyses of the Exemplary HTC Runs

Elemental analysis, FTIR, XPS, and SEM analyses were performed for each of NFC-Runs01-04. The results are presented in the Table 1 and in FIGS. 1-8E.

Figure 2:
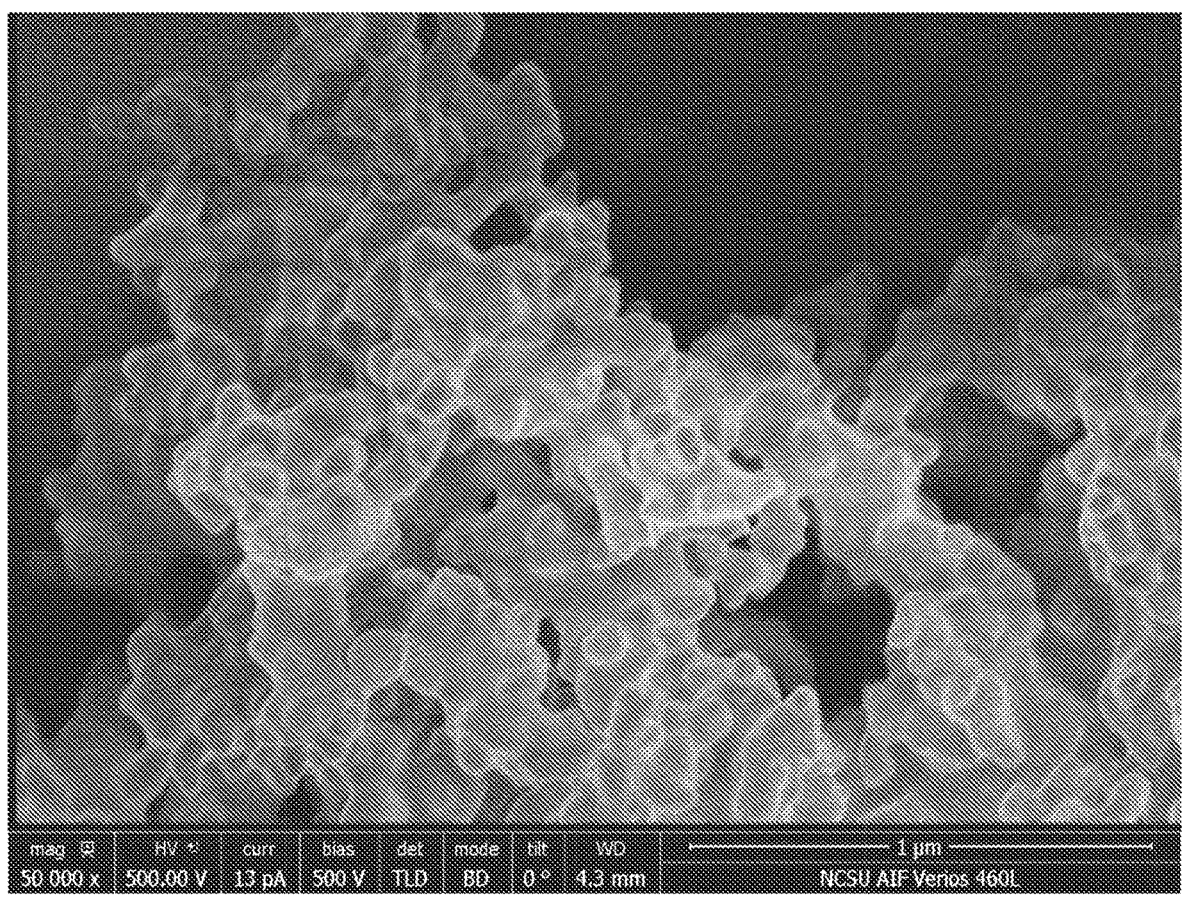
Figure 5:
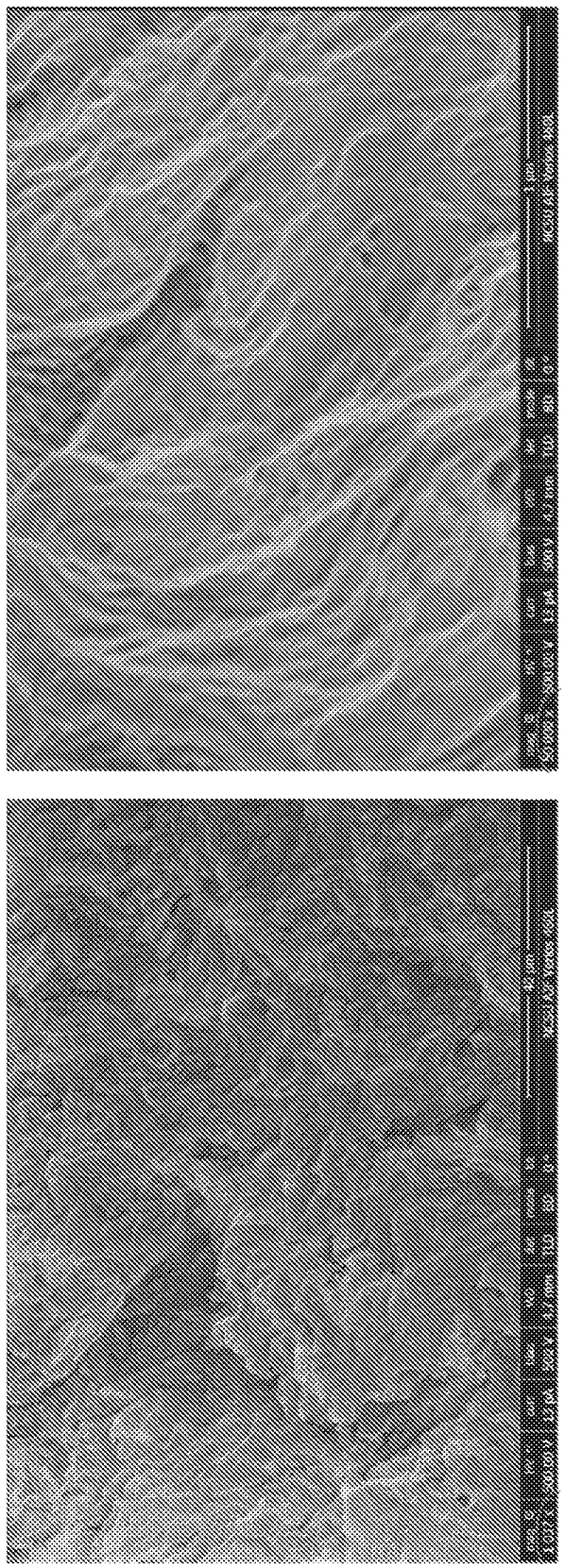
FIG. 5 is a set of scanning electron microscope (SEM) images of the HTC run described in EXAMPLE 1. The magnification of the sample in the left panel is 1,037× (scale bar is 50 µm) and in the right panel is 50,000× (scale bar is 1 µm).
Figure 6:
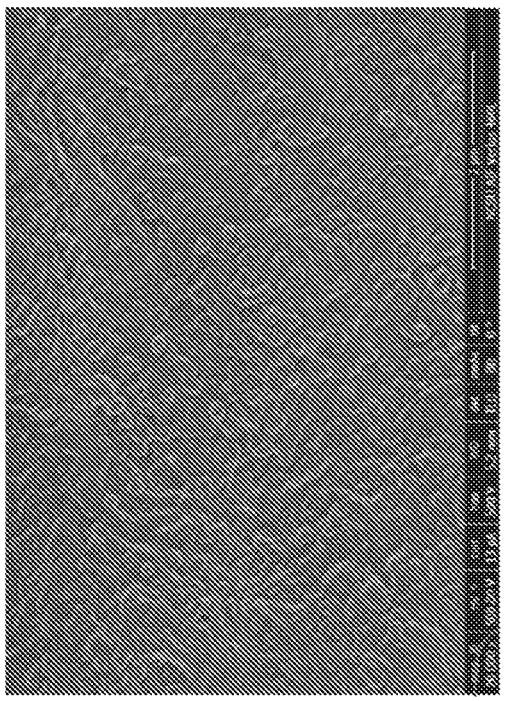
FIG. 6 is a set of scanning electron microscope (SEM) images of the HTC run described in EXAMPLE 2. The magnification of the sample in the left panel is 5,000× (scale bar is 10 µm), in the top right panel is 20,000× (scale bar is 2 µm), and in the lower right panel is 50,001× (scale bar is 1 µm).
Figure 6:
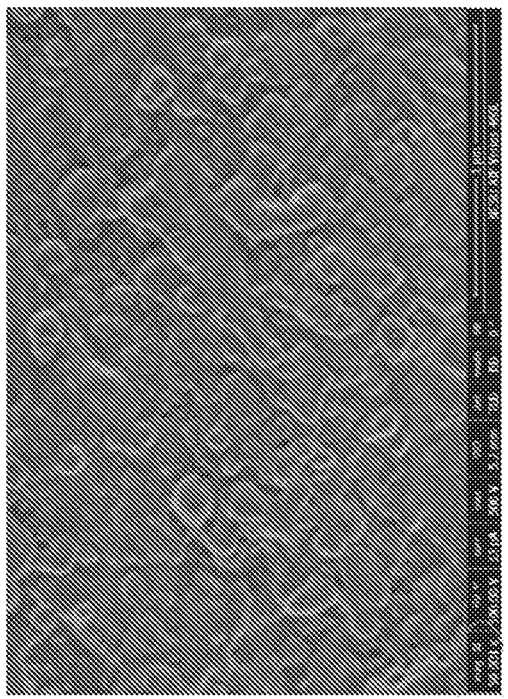
Figure 6:
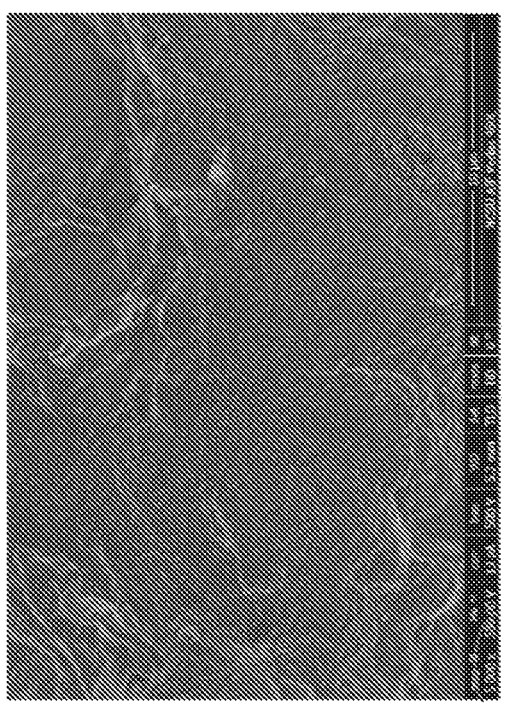
Figure 7:
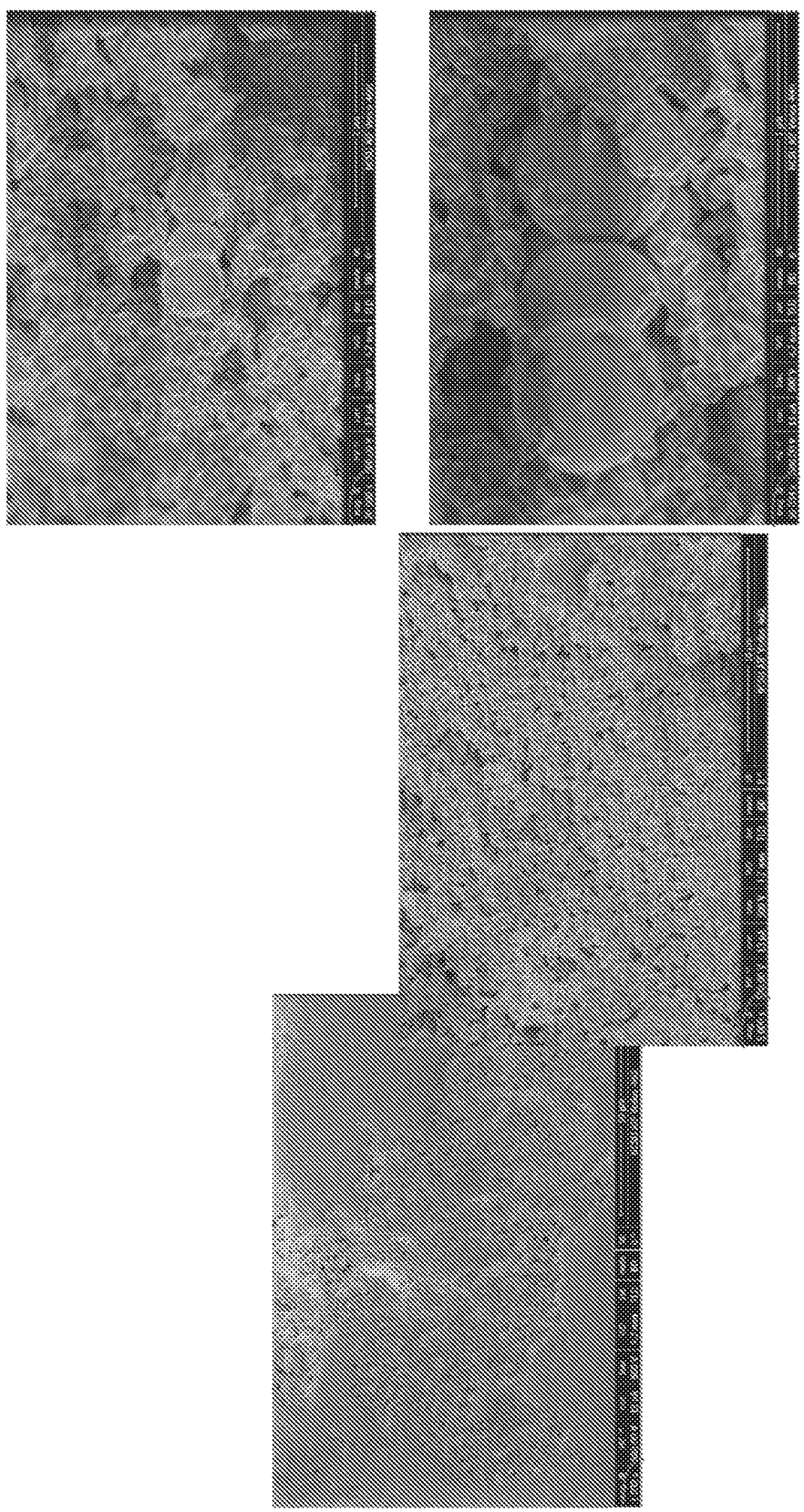
FIG. 7 is a set of scanning electron microscope (SEM) images of the HTC run described in EXAMPLE 4. The magnification of the sample in the left panel is 1,032× (scale bar is 50 µm), in the middle panel is 5,000× (scale bar is 10 µm), in the top right panel is 20,000× (scale bar is 2 µm), and in the lower right panel is 50,034× (scale bar is 1 µm).
Figure 8A:
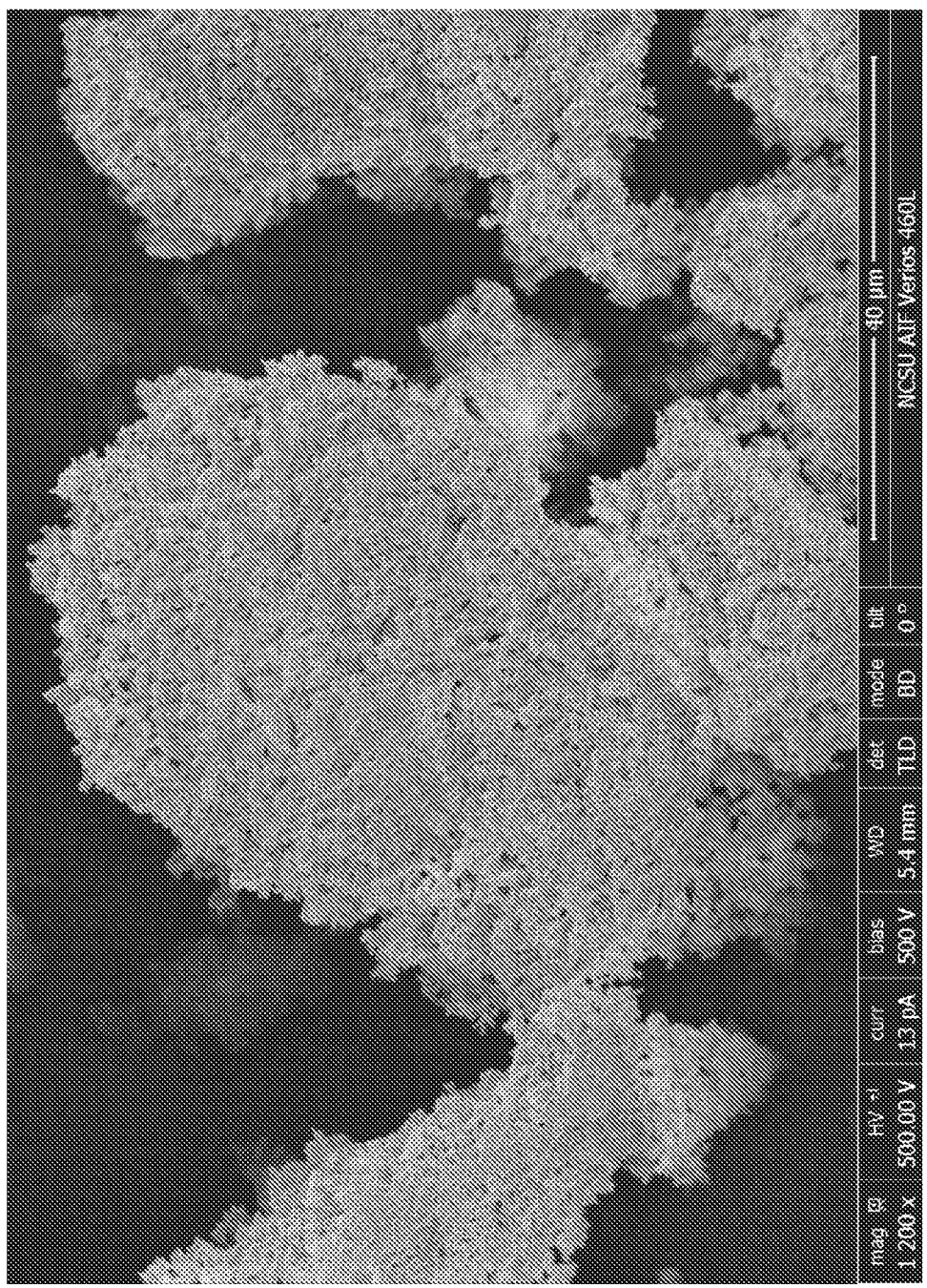
FIGS. 8A-8E are scanning electron microscope (SEM) images of the HTC run described in EXAMPLE 3. The magnification of the sample in FIG. 8A is 1,200× (scale bar is 40 µm). The magnification of the sample in FIG. 8B is 5,000× (scale bar is 10 µm). The magnification of the sample in FIG. 8C is 20,000× (scale bar is 2 µm). The magnification of the sample in FIG. 8D is 50,000× (scale bar is 1 µm). The magnification of the sample in FIG. 8E is 100,007× (scale bar is 400 nm).
Figure 8B:
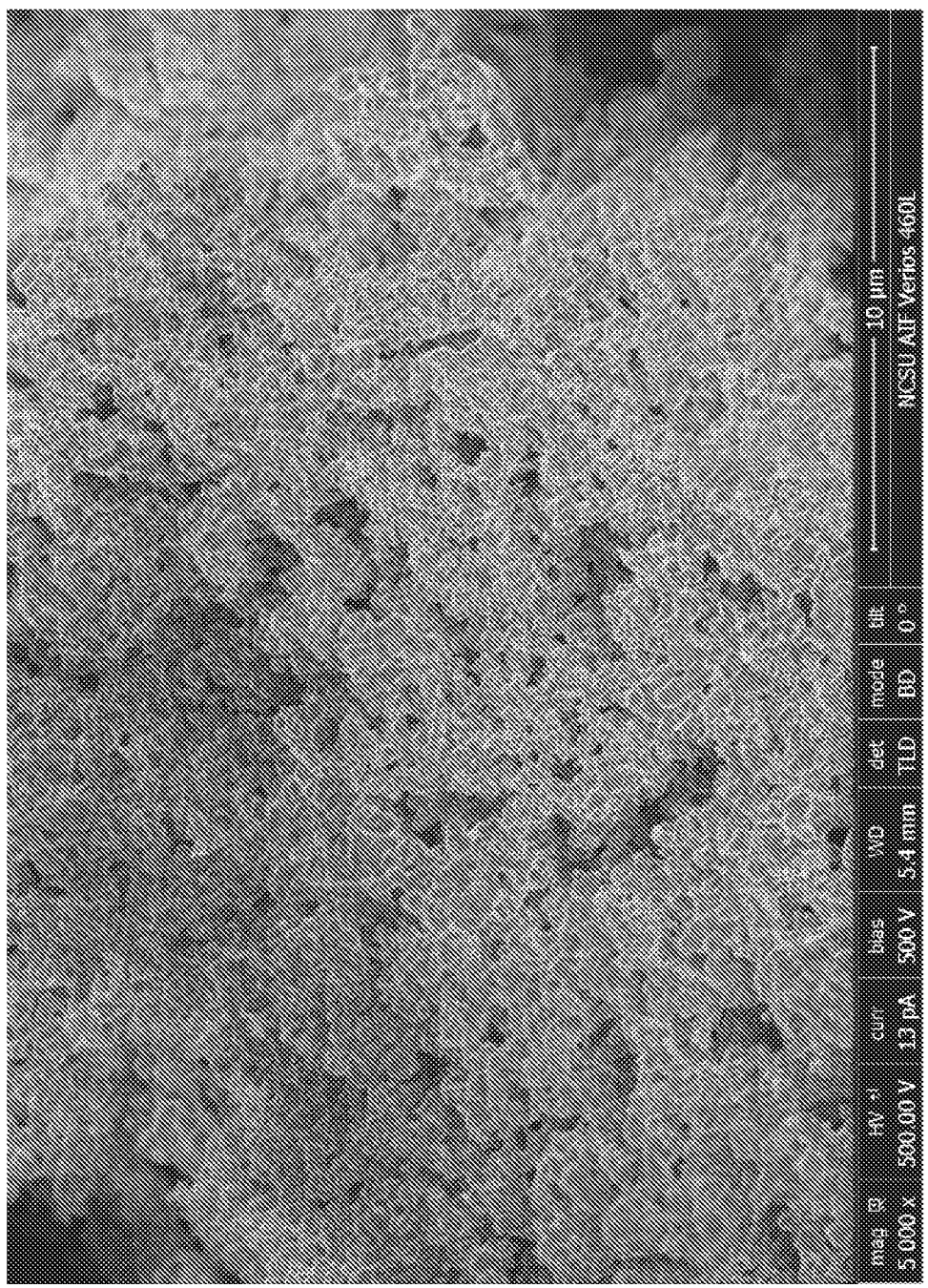
Figure 8C:
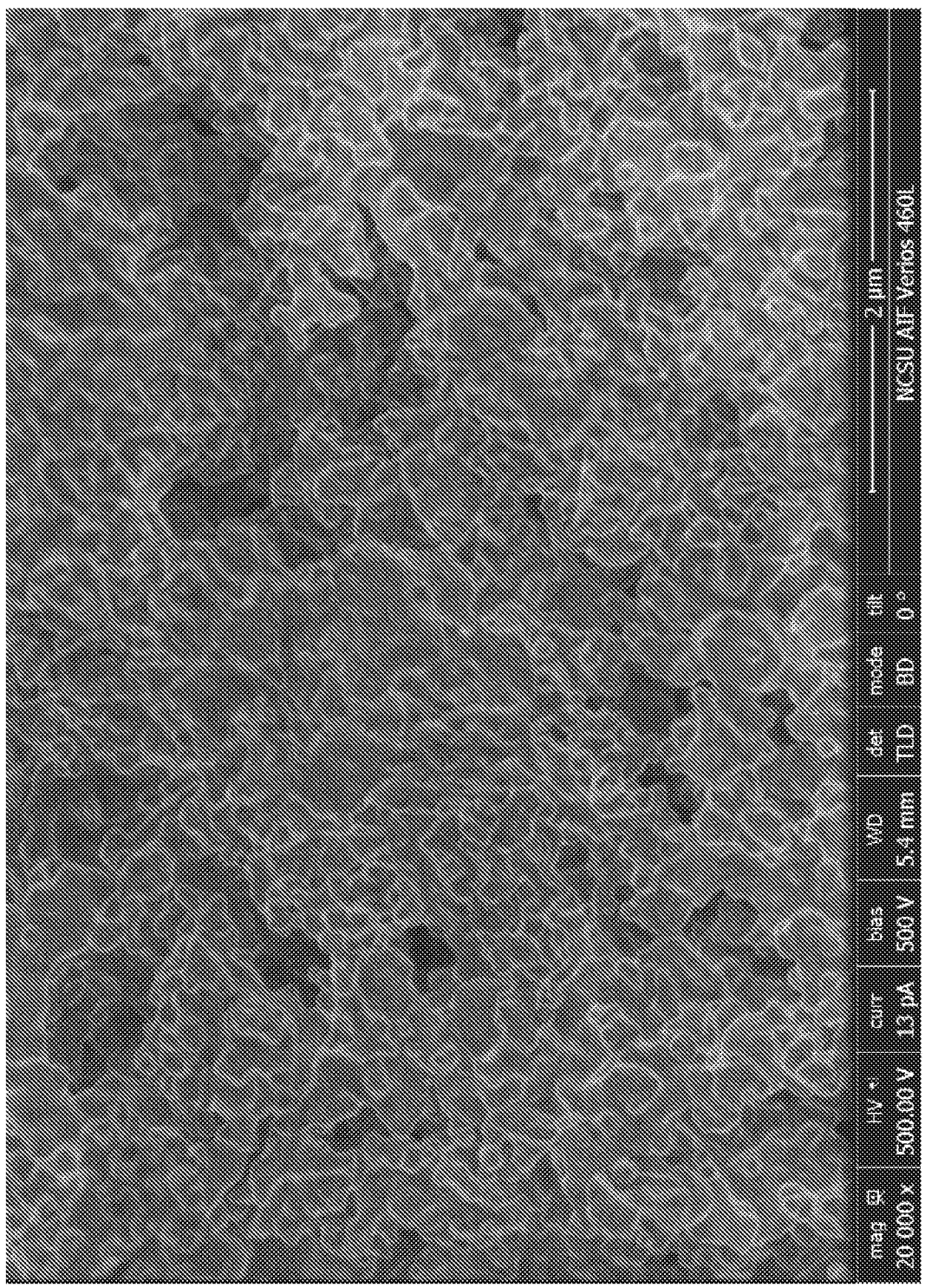
Figure 8D:
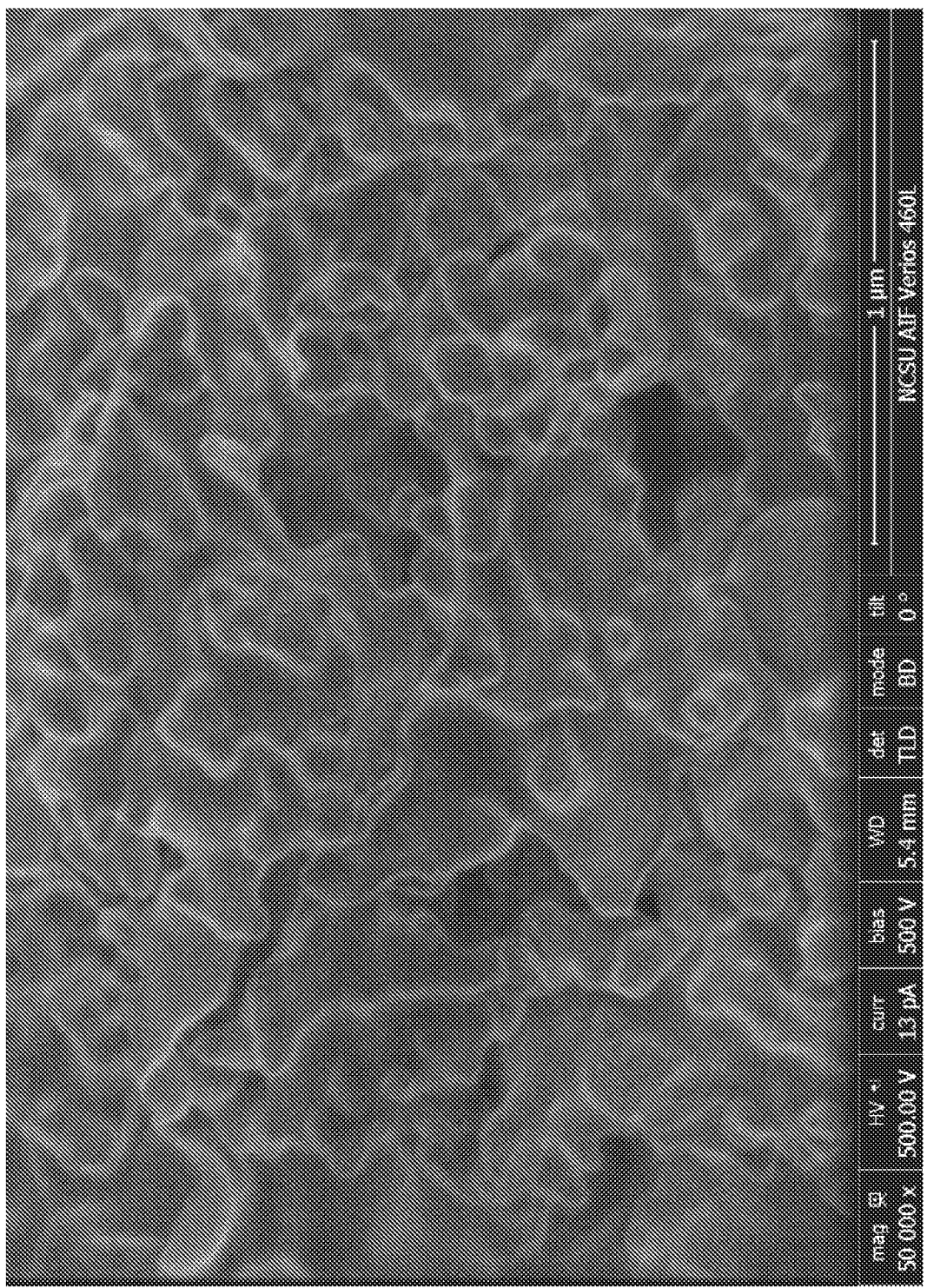
Figure 8E:
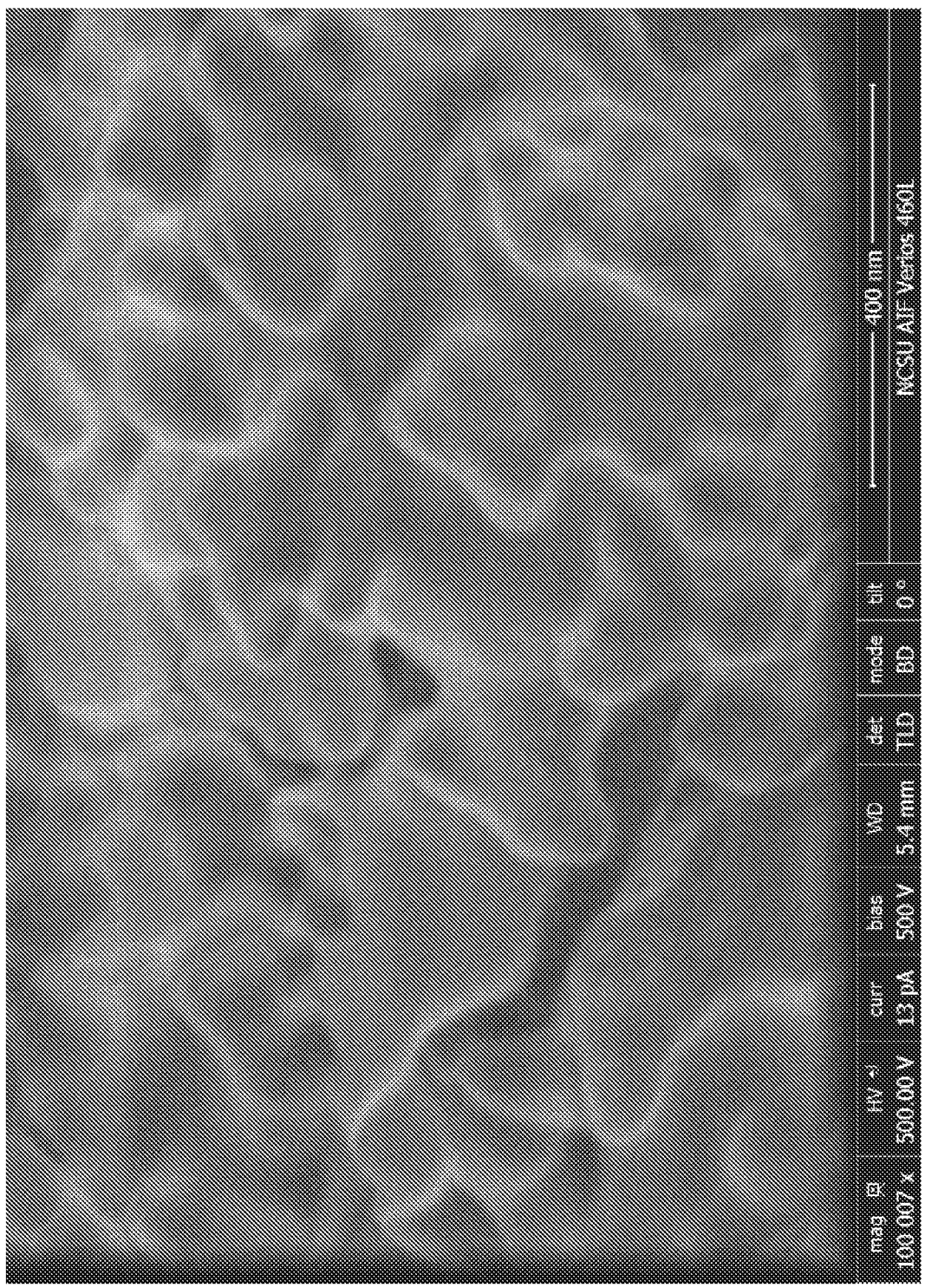

As shown in FIGS. 1 and 2, after the HTC process the resulting hydrochar materials have structures of spherical or near spherical features. The size of these spherical structures ranges from a few tens of nanometers in diameter to a few tens of micrometers. In adding an activation process, structure within structure formations are created, as the activation creates additional porosity to the material and including the micropore, mesopore, and macropore regions. Referring to FIG. 5, it was observed that low temperature HTC does not create any finer spherical structures. A catalyst like citric acid may allow the use of lower temperatures. Referring to FIG. 6, it was observed that with this temperature (200° C.) the process starts building the spherical hydrochar structures. Referring to FIG. 7, at 225° C. spherical hydrochar structures and substructures were observed. Referring to FIGS. 8A-8E, the 225° C. sample was evaluated with higher magnification to explore the surface morphology and substructures.

Figure 3:
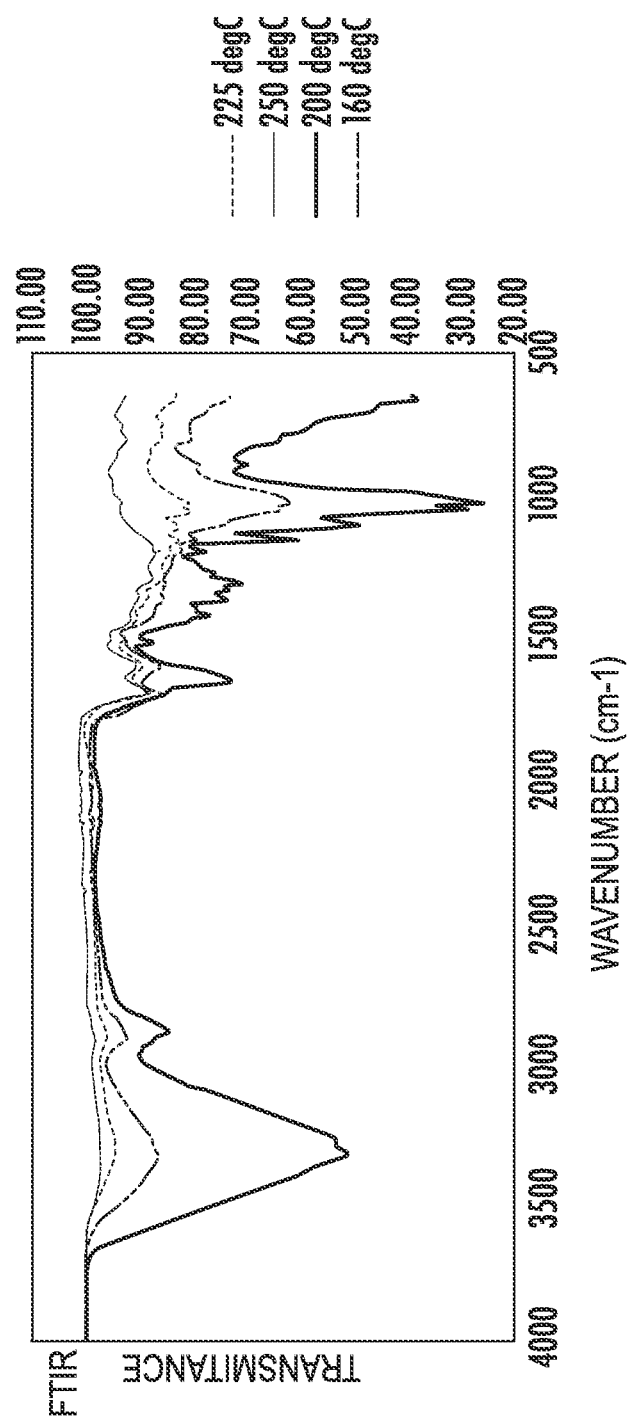
FIG. 3 is a graph of FTIR traces of the HTC runs described in EXAMPLES 1-4.
Figure 4A:
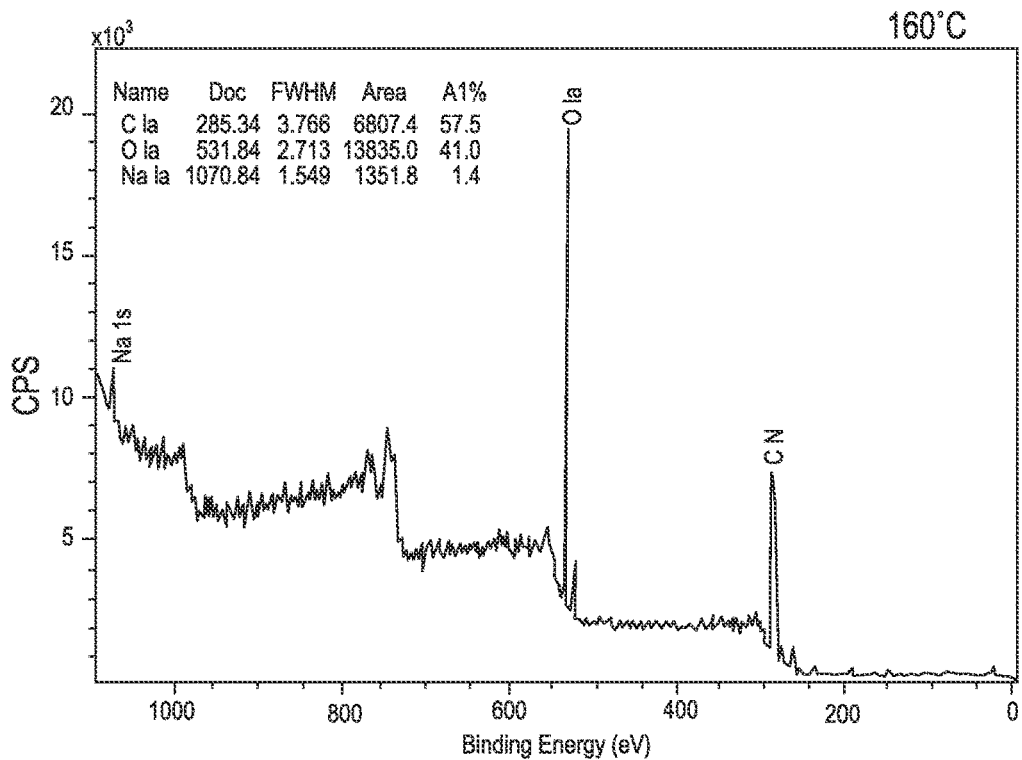
FIGS. 4A-4E are XPS plots of the HTC runs described in EXAMPLES 1-4.
Figure 4B:
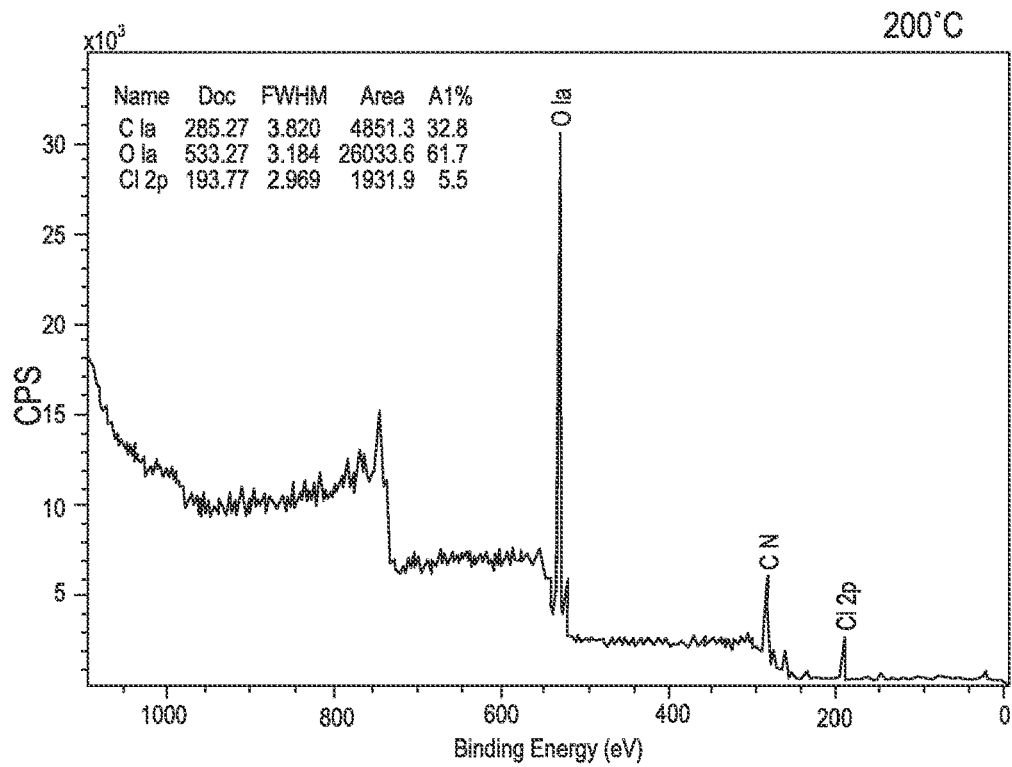
Figure 4C:
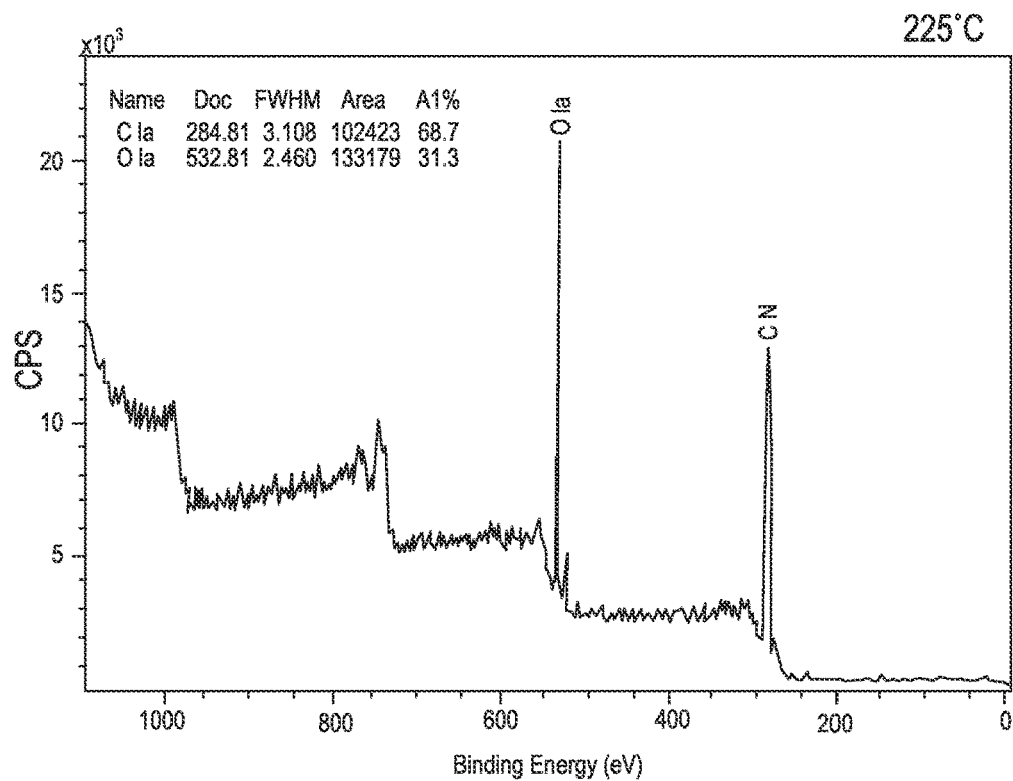
Figure 4D:
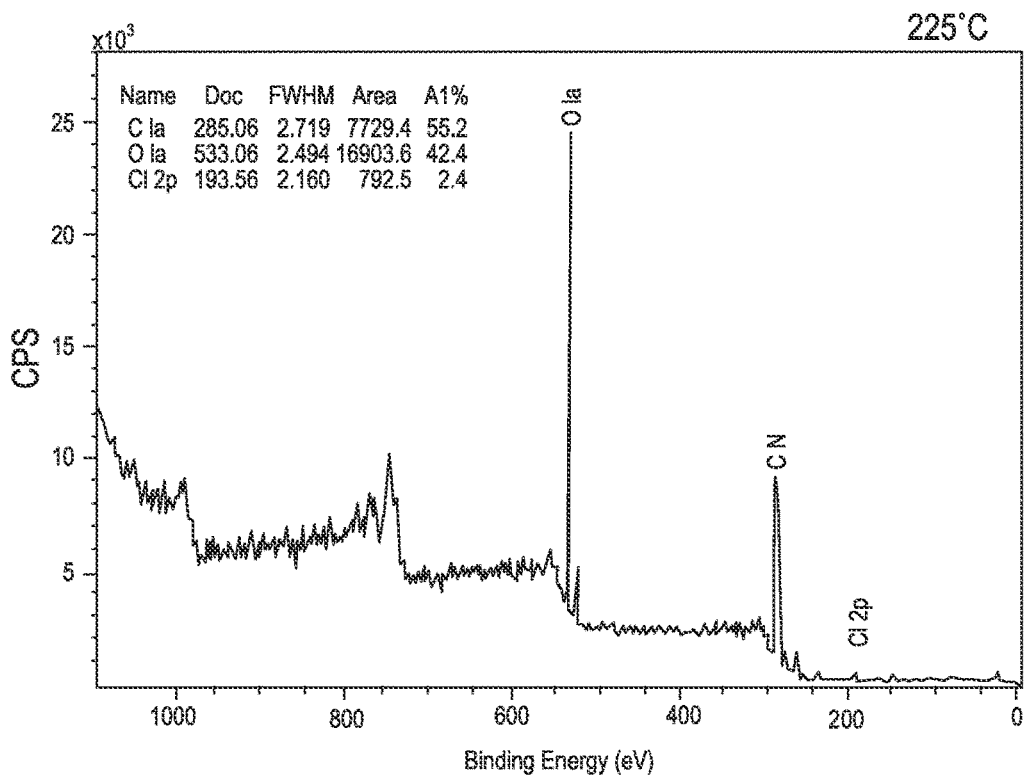
Figure 4E:
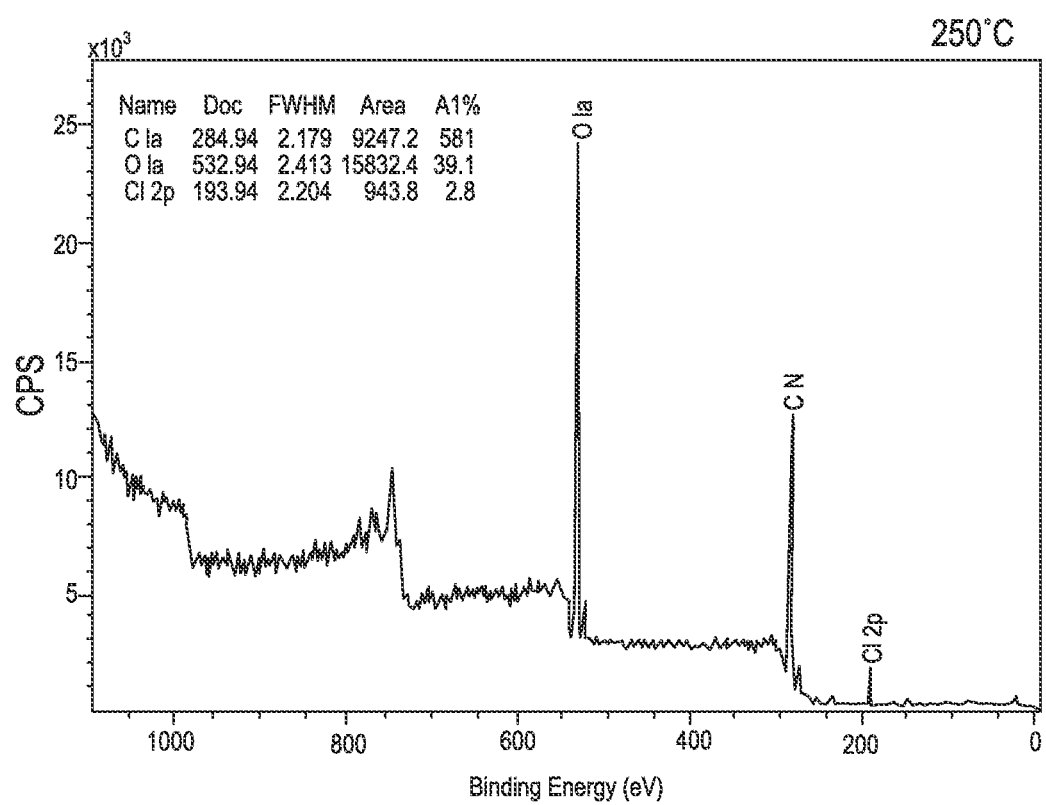

In FTIR traces shown in FIG. 3, the peak at 2920 cm-1 indicates the C H asymmetrical stretching vibration in methyl, methylene and methine groups, while absorption at 2846 cm-1 can normally be associated with symmetrical stretching vibrations. The two bands at 1730 cm-1 and 1630 cm-1 are considered to be related to C O vibration of carbonyl groups and can be assigned to be unconjugated and conjugated with aromatic rings, respectively. The band at the position of 1515 cm-1 can be assigned to the C C stretching of the aromatic rings. The C H bending vibration in methyl groups can be seen in band of 1460 cm-1. The appearance of the C O stretching bands identified at 1372 cm-1 and 1247 cm-1 would suggest the existence of syringyl and guaiacyl groups. The absorption at 1164 cm-1 and 1106 cm-1 originates from the C H deformations in plane of guaiacyl and syringyl units and are more apparent to the samples processed at lower temperatures.

Example 6

Exemplary Soybean Hull Runs

In HTC experiments on soybean hulls, hydrochar was produced for possible land remediation and fertilization-related applications. A Parr reactor was used for HTC and several analytical techniques including, for example, SEM, EEL—Electron Energy Loss Spectroscopy, and FTIR were used for materials characterization.

The produced hydrochar has gone through preliminary materials characterization and shows similar characteristics as commercial agricultural hydrochar. Also, carbon activation is a key step to these high value carbon products and a preliminary activation of the soybean hull hydrochar with promising results.

REFERENCES

All references cited in the instant disclosure, including but not limited to all patents, patent applications and publications thereof, scientific journal articles, and database entries are incorporated herein by reference in their entireties to the extent that they supplement, explain, provide a background for, or teach methodology, techniques, and/or compositions employed herein.

Carruthers (1986) *Some Modern Methods of Organic Synthesis*, 3rd Edition, Cambridge University Press, New York, United States of America.
Demir et al. (2015) 54 Ind Eng Chem Res 10731-10739.
Larock (1989) *Comprehensive Organic Transformations*, VCH Publishers, Inc., New York, United States of America.
Sevilla & Fuertes (2009) 47 Carbon 2281-2289.
Simon & Gogotsi (2013) 46 Accounts of Chemical Research 1094-1103.
Smith & March (2001) *March's Advanced Organic Chemistry*, 5th Edition, John Wiley & Sons, Inc., New York, United States of America.
Sorrell (2006) *Organic Chemistry*, 2nd Edition, University Science Books, South Orange, N.J., United States of America.
Teh et al. (2015) 7 Nanosci Nanotech Lett 611-615.
U.S. Patent Application Publication Nos. 2017/0197858 and 2017/0210625.
U.S. Pat. Nos. 8,414,664; 8,637,718; 9,109,180; 9,238,583; 9,290,390; 9,318,773; 9,359,390; 9,458,021; 9,718,717; 9,828,249; and 9,879,344.
Xiao et al. (2012) 118 Bioresource Technology 619-623.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A method for preparing a carbon powder from a cellulose-containing liquid, the method comprising exposing the cellulose-containing liquid to a hydrothermal carbonization process to convert carbonaceous material present therein into a carbon powder;
   wherein the cellulose-containing liquid comprises about 5% micro—and/or nanofibrillated cellulose by weight in water.

2. The method of claim 1, wherein the cellulose-containing liquid comprises agricultural waste residue.

3. The method of claim 2, wherein the agricultural waste residue has been grinded to a powder.

4. The method of claim 1, wherein the cellulose present in the cellulose-containing liquid comprises cellulose nanocrystals (CNCs).

5. The method of claim 4, wherein the CNCs have been generated from plant cellulose pulp by acid hydrolysis.

6. The method of claim 1, wherein the hydrothermal carbonization process is performed under conditions sufficient to carbonize at least 60%, at least 65%, at least 70% but less than 95%, less than 90%, less than 85%, less than 80%, or less than 75% of the carbonaceous material present in the cellulose-containing liquid.

7. The method of claim 1, wherein hydrothermal carbonization process comprises exposing the cellulose-containing liquid to the hydrothermal carbonization process at temperatures from about 170° C. to 350° C.

8. The method of claim 1, wherein the cellulose-containing liquid is subjected to a hydrothermal carbonization at temperatures in the range from about 180° C. to about 250° C.

9. The method of claim 8, wherein the cellulose-containing liquid is subjected to a hydrothermal carbonization at 250° C.

10. The method of claim 8, wherein the cellulose-containing liquid is subjected to a hydrothermal carbonization 225° C.

11. The method of claim 1, wherein the hydrothermal carbonization process comprises exposing the cellulose-containing liquid to the hydrothermal carbonization process in a closed reactor at a temperature of about 250° C. for about 25 minutes before allowing the processed material to cool to room temperature.

12. The method of claim 1, wherein performing the hydrothermal carbonization process in the closed reactor results in an autogenous pressure of about 10 to about 50 bars within the closed reactor.

13. The method of claim 1, wherein the carbon powder has an average grain size of about 100 nm or less, about 250 nm or less, about 500 nm or less, about 750 nm or less, about 1000 nm or less, about 1.25 μm or less, about 1.5 m or less, about 2.0 μm or less, or about 5.0 μm or less.

14. The method of claim 1, wherein the carbon powder is configured for use in an application selected from the group consisting of a metal-carbon composite, an activated carbon for $CO_2$ capture, an active surface, a structural composite, an absorbent, an electronics application, and energy storage.

15. The method of claim 1, wherein the hydrothermal carbonization process is a batch hydrothermal carbonization process.

16. The method of claim 1, wherein the hydrothermal carbonization process is a continuous hydrothermal carbonization process.

17. The method of claim 1, further comprising separating the carbon powder from liquid containing the carbon powder after the hydrothermal carbonization process is performed.

18. The method of claim 17, wherein the liquid containing the carbon powder comprises one or more of furfurals and organic acids after the hydrothermal carbonization process is performed.

19. The method of claim 18, further comprising isolating at least one of the one or more chemicals of interest from the liquid after the hydrothermal carbonization process is performed.

20. A method for preparing a carbon powder from a cellulose-containing liquid, the method comprising
    exposing the cellulose-containing liquid to a hydrothermal carbonization process to convert carbonaceous material present therein into a carbon powder; and
    exposing the carbon powder to an activation process;
    wherein the cellulose-containing liquid comprises about 5% micro—and/or nanofibrillated cellulose by weight in water.

21. The method of claim 20, wherein the cellulose-containing liquid comprises agricultural waste residue.

22. The method of claim 21, wherein agricultural waste residue has been grinded to a powder.

23. The method of claim 20, wherein the cellulose present in the cellulose-containing liquid comprises cellulose nanocrystals (CNCs).

24. The method of claim 23, wherein the CNCs have been generated from plant cellulose pulp by acid hydrolysis.

25. The method of claim 20, comprising exposing the carbon powder to an activation process selected from the group consisting of exposure to steam at a temperature of at least 800° C. and chemical activation.

26. The method of claim 25, wherein the chemical activation is chemical activation with phosphoric acid and zinc chloride treated with sodium hydroxide.

27. The method of claim 20, wherein the hydrothermal carbonization process is performed under conditions sufficient to carbonize at least 60%, at least 65%, at least 70% but less than 95%, less than 90%, less than 85%, less than 80%, or less than 75% of the carbonaceous material present in the cellulose-containing liquid.

28. The method of claim 20, wherein hydrothermal carbonization process comprises exposing the cellulose-containing liquid to the hydrothermal carbonization process at temperatures from about 170° C. to 350° C.

29. The method of claim 20, wherein the cellulose-containing liquid is subjected to a hydrothermal carbonization at temperatures in the range from about 180° C. to about 250° C.

30. The method of claim 29, wherein the cellulose-containing liquid is subjected to a hydrothermal carbonization at 250° C.

31. The method of claim 20, wherein the hydrothermal carbonization process comprises exposing the cellulose-containing liquid to the hydrothermal carbonization process in a closed reactor at a temperature of about 250° C. for about 25 minutes before allowing the processed material to cool to room temperature.

32. The method of claim 20, wherein performing the hydrothermal carbonization process in the closed reactor results in an autogenous pressure of about 10 to about 50 bars within the closed reactor.

33. The method of claim 20, wherein the carbon powder has an average grain size of about 100 nm or less, about 250 nm or less, about 500 nm or less, about 750 nm or less, about 1000 nm or less, about 1.25 μm or less, about 1.5 m or less, about 2.0 μm or less, or about 5.0 μm or less.

34. The method of claim 20, wherein the carbon powder is configured for use in an application selected from the group consisting of a metal-carbon composite, an activated carbon for $CO_2$ capture, an active surface, a structural composite, an absorbent, an electronics application, and energy storage.

35. The method of claim 20, wherein the hydrothermal carbonization process is a batch hydrothermal carbonization process.

36. The method of claim 20, wherein the hydrothermal carbonization process is a continuous hydrothermal carbonization process.

37. The method of claim 20, further comprising separating the carbon powder from liquid containing the carbon powder after the hydrothermal carbonization process is performed.

38. The method of claim 37, wherein the liquid containing the carbon powder comprises one or more of furfurals and organic acids after the hydrothermal carbonization process is performed.

39. The method of claim 38, further comprising isolating at least one of the one or more chemicals of interest from the liquid after the hydrothermal carbonization process is performed.

\* \* \* \* \*